(12) United States Patent
Kim et al.

(10) Patent No.: US 11,206,586 B2
(45) Date of Patent: Dec. 21, 2021

(54) ELECTRONIC DEVICE TO SUPPORT DUAL CONNECTIVITY AND OPERATING METHOD THEREOF

(71) Applicant: Samsung Electronics Co., Ltd., Suwon-si (KR)

(72) Inventors: Sangwon Kim, Suwon-si (KR); Keonyoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/003,551

(22) Filed: Aug. 26, 2020

(65) Prior Publication Data
US 2021/0068012 A1    Mar. 4, 2021

(30) Foreign Application Priority Data
Aug. 28, 2019   (KR) .......................... 10-2019-0106090

(51) Int. Cl.
*H04W 36/00* (2009.01)
*H04W 36/30* (2009.01)

(52) U.S. Cl.
CPC .  *H04W 36/0069* (2018.08); *H04W 36/00835* (2018.08); *H04W 36/30* (2013.01)

(58) Field of Classification Search
CPC . H04W 36/0069; H04W 36/08; H04W 36/30; H04W 36/0061; H04W 36/0027;
(Continued)

(56) References Cited

U.S. PATENT DOCUMENTS

2014/0335882 A1* 11/2014 Lee ........................ H04W 76/15
                                                                 455/452.2
2016/0057668 A1    2/2016 Lee et al.
(Continued)

FOREIGN PATENT DOCUMENTS

EP              2983405 A1 *  2/2016  ........ H04W 72/0426
KR   10-2018-0090177 A       8/2018

OTHER PUBLICATIONS

International Search Report and Written Opinion of the International Searching Authority in connection with International Application No. PCT/KR2020/008584 dated Oct. 15, 2020, 7 pages.
(Continued)

*Primary Examiner* — Allahyar Kasraian

(57) ABSTRACT

An electronic device includes a communication processor configured to support first network communication, second network communication, and a memory configured to store information about a first band supporting dual connectivity for the first and the second network communication among a plurality of bands that correspond to the first network communication. The communication processor may be configured to: camp on a first cell supporting the first network communication; receive information about a neighbor cell from the first cell after camping on the first cell; identify a second band supporting the dual connectivity among at least one band that corresponds to the neighbor cell based on the information about the first band and the information about the neighbor cell; search for the second band among the at least one band that corresponds to the neighbor cell; and perform cell reselection from the first cell to another cell based on the search result.

20 Claims, 19 Drawing Sheets

(58) Field of Classification Search
CPC ....... H04W 36/0083; H04W 36/00835; H04W 36/0094; H04W 56/001; H04W 36/0066; H04W 36/00837
See application file for complete search history.

(56) References Cited

U.S. PATENT DOCUMENTS

| | | | |
|---|---|---|---|
| 2017/0094571 A1 | 3/2017 | Yu et al. | |
| 2017/0195935 A1* | 7/2017 | Xu ..................... | H04W 36/0055 |
| 2018/0220345 A1 | 8/2018 | Moon et al. | |
| 2019/0037417 A1 | 1/2019 | Lei et al. | |
| 2019/0223091 A1 | 7/2019 | Huang-Fu et al. | |
| 2020/0092928 A1* | 3/2020 | Shi ........................ | H04W 76/14 |
| 2020/0337054 A1* | 10/2020 | Kwok ............... | H04W 72/0486 |
| 2021/0076438 A1* | 3/2021 | Lee ................. | H04W 36/00837 |
| 2021/0168674 A1* | 6/2021 | He ........................ | H04W 36/08 |

OTHER PUBLICATIONS

3GPP TS 38.304 V15.4.0 (Jun. 2019), Technical Specification, 3rd Generation Partnership Project; Technical Specification Group Radio Access Network; NR; User Equipment (UE) procedures in Idle mode and RRC Inactive state, (Release 15), Jun. 2019, 29 pages.
"LTE; Evolved Universal Terrestrial Radio Access (E-UTRA); Requirements for support of radio resource management (3GPP TS 36.133 version 14.3.0 Release 14)", ETSI TS 136 133 V14.3.0 (Apr. 2017), 2389 pages.

* cited by examiner

SERVING CELL : B1
BAND SUPPORTING DC : B5, B66
BAND THAT DOES NOT SUPPORT DC ; B1, B2, B4, B13
BAND HAVING LOW PRIORITY : B2, B4, B5, B66

Srxlev > SnonIntraSearch P
Squal > SnonIntraSearch Q

ELECTRONIC DEVICE TO SUPPORT DUAL CONNECTIVITY AND OPERATING METHOD THEREOF

CROSS-REFERENCE TO RELATED APPLICATION

This application is based on and claims priority under 35 U.S.C. § 119 to Korean Patent Application No. 10-2019-0106090 filed on Aug. 28, 2019 in the Korean Intellectual Property Office, the disclosure of which is incorporated by reference herein in its entirety.

BACKGROUND

1. Field

Various embodiments of the present disclosure relate to an electronic device to support dual connectivity and an operating method thereof.

2. Description of Related Art

Along with the development of mobile communication technology, portable terminals equipped with various functions have recently become popular, and efforts have been made to develop $5^{th}$ generation (5G) communication systems to meet the increasing demands for wireless data traffic. In order to achieve high data rates, implementation of 5G communication systems in ultra-high frequency bands as well as in the high frequency bands used in $3^{rd}$ generation (3G) and long term evolution (LTE) is under consideration to provide faster data rates.

For implementation of 5G communication, a stand-alone (SA) scheme and a non-stand alone (NSA) scheme are considered. The NSA scheme enables use of a new radio (NR) system together with the legacy LTE system. In the NSA scheme, a user equipment (UE) may communicate with a next-generation Node B (gNB) (or an SgNB) of the NR system as well as an evolved Node B (eNB) of the LTE system. A technology that enables a UE to use heterogeneous communication systems may be referred to as dual connectivity.

Dual connectivity was first proposed under $3^{rd}$ generation partnership project (3GPP) Release-12. The first proposed dual connectivity was for using a 3.5 GHz frequency band as a small cell in addition to the LTE system. In the 5G NSA scheme, implementation of the dual connectivity suggested by 3GPP Release-12 by using the LTE system as a master node and the NR system as a secondary node is under consideration.

SUMMARY

A plurality of bands may be defined in an LTE network communication. A part of the plurality of bands may support EN-DC, and another part of the plurality of bands may not support the EN-DC. If an electronic device (e.g., a user equipment (UE)) camps on an LTE cell which does not support the EN-DC and is subsequently connected (e.g., RRC connected), an EN-DC service may not be provided to the electronic device. For supporting the EN-DC service, the electronic device needs to camp on a cell of a band supporting the EN-DC.

Meanwhile, a UE may receive a system information block (SIB) from a camped-on cell, and the SIB may include an inter-frequency carrier frequency and a corresponding priority. According to 3rd generation partnership project (3GPP) TS 36.133, it may take maximum Thigher_priority_search time to reselect a cell corresponding to a frequency having a priority higher than a serving cell. Alternatively, according to 3GPP TS 36.133, for reselecting a cell corresponding to a frequency having a priority lower than or equal to the serving cell, a measurement value (e.g., Srxlev and/or Squal) for the serving cell needs to be less than or equal to a threshold value (e.g., SnonIntraSearchP and/or SnonIntraSearchQ), so the cell reselection may not be performed until the criterion is satisfied. According to the above, if the electronic device operates without distinguishing between a cell which supports the EN-DC and a cell which does not support the EN-DC, a probability and frequency of performing reselection for the cell supporting the EN-DC may decrease.

An electronic device and an operating method thereof according to various embodiments may preferentially perform a search for a frequency supporting dual connectivity and perform cell reselection based on the search result.

An electronic device and an operating method thereof according to various embodiments may preferentially perform a search for a frequency where a cell operating as a master node (MN) of dual connectivity may exist and perform cell reselection based on the search result.

An electronic device according to various embodiments includes at least one communication processor configured to support a first network communication and a second network communication, and a memory configured to store information about at least one first band supporting dual connectivity for the first network communication and the second network communication among a plurality of bands which correspond to the first network communication, and the at least one communication processor may be configured to: camp on a first cell supporting the first network communication; receive information about at least one neighbor cell from the first cell after camping on the first cell; identify at least one second band supporting the dual connectivity among at least one band which corresponds to the at least one neighbor cell based on the information about the at least one first band and the information about the at least one neighbor cell; preferentially search for the at least one second band among the at least one band which corresponds to the at least one neighbor cell; and perform cell reselection from the first cell to another cell based on the search result.

An electronic device according to various embodiments includes at least one communication processor configured to support a first network communication and a second network communication; and a memory configured to store information about at least one first band supporting dual connectivity for the first network communication and the second network communication among a plurality of bands which correspond to the first network communication, and the at least one communication processor may be configured to: camp on a first cell supporting the first network communication; receive information about at least one neighbor cell from the first cell after camping on the first cell; identify at least one band which has a priority higher than a priority of the first cell and corresponds to the at least one neighbor cell; identify at least one second band supporting the dual connectivity among at the least one band based on the information about the at least one first band; preferentially search for the at least one second band among the at least one band which corresponds to the at least one neighbor cell; and perform cell reselection from the first cell to another cell based on the search result.

An electronic device according to various embodiments includes at least one communication processor configured to support a first network communication and a second network communication; and a memory configured to store information about at least one first band supporting dual connectivity for the first network communication and the second network communication among a plurality of bands which correspond to the first network communication, and the at least one communication processor may be configured to: camp on a first cell supporting the first network communication; receive information about at least one neighbor cell from the first cell after camping on the first cell; identify at least one band which has a priority lower than or equal to a priority of the first cell and corresponds to the at least one neighbor cell; identify at least one second band supporting the dual connectivity among at the least one band based on the information about the at least one first band; and search for the at least one second band in a case that a cell selection RX level value (Srxlev) for the first cell is greater than a first threshold value, and a cell selection quality value (Squal) for the first cell is greater than a second threshold value.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
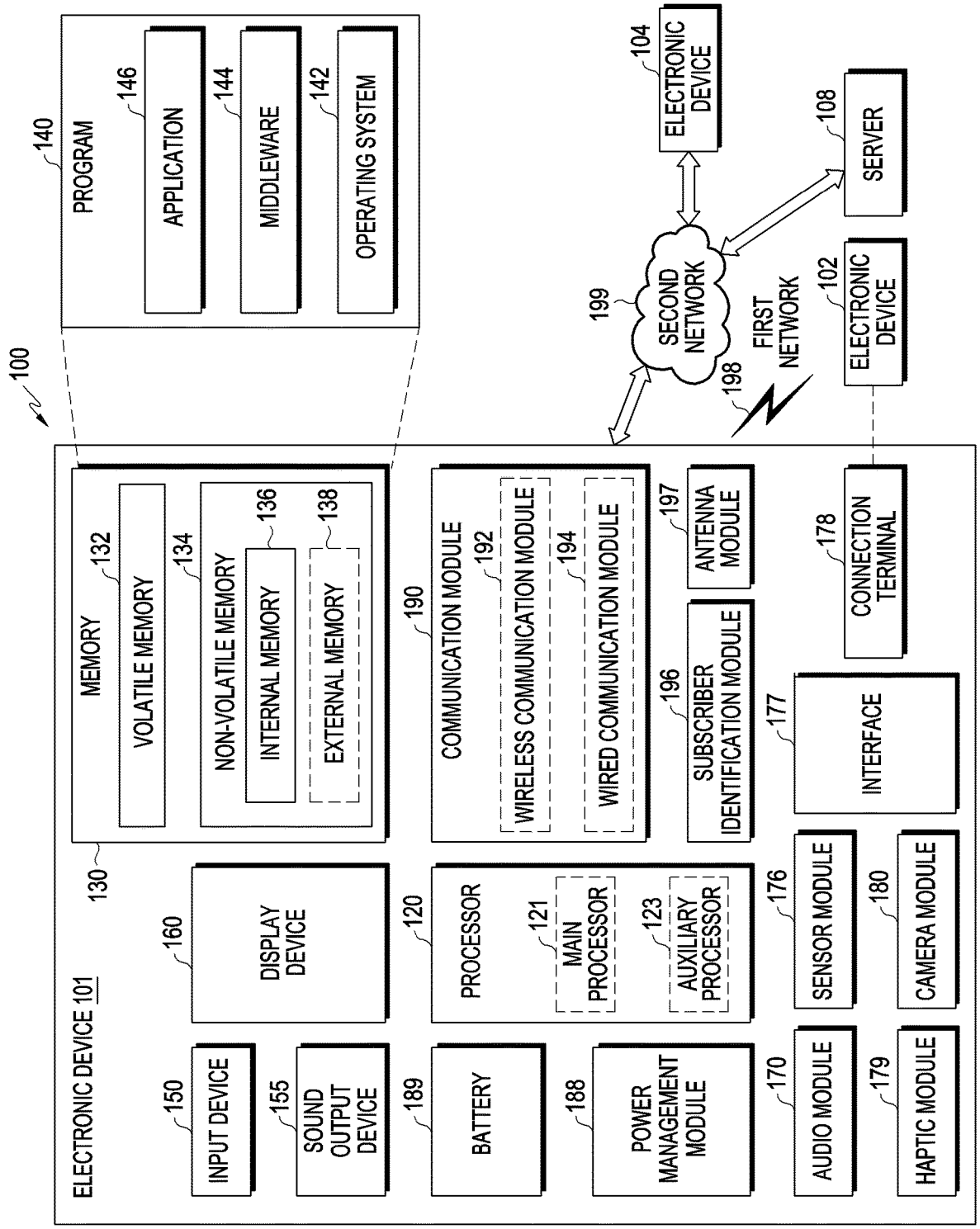
FIG. 1 illustrates a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
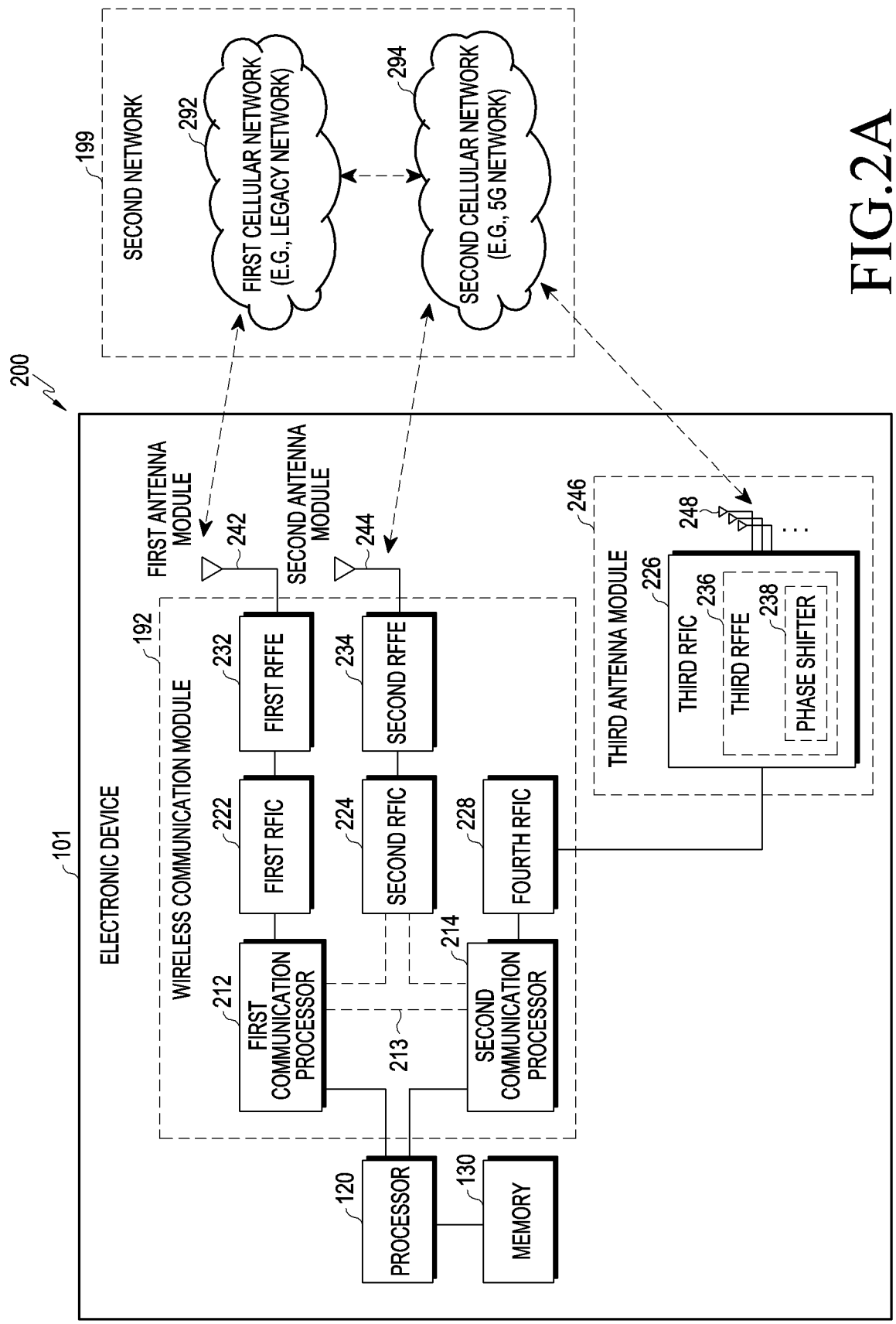
FIG. 2A illustrates a block diagram of an electronic device for supporting a legacy network communication and a 5G network communication according to various embodiments.

FIG. 2A illustrates a block diagram 200 of an electronic device 101 for supporting a legacy network communication and a 5$^{th}$ generation (5G) network communication according to various embodiments. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A network 199 may include a first network 292 and a second network 294. According to another embodiment, the electronic device 101 may further include at least one of the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of a wireless communication module 192. According to another embodiment, the fourth RFIC 228 may be omitted or included as part of the third RFIC 226.

The first communication processor 212 may establish a communication channel in a band to be used for a wireless communication with the first network 292 and support a legacy network communication through the established communication channel. According to various embodiments, the first network 292 may be a legacy network including a $2^{nd}$ generation (2G), $3^{rd}$ generation (3G), $4^{th}$ generation (4G), or LTE network. The second communication processor 214 may establish a communication channel corresponding to a specified band (e.g., about 6 GHz to about 60 GHz) out of a band to be used for a wireless communication with the second network 294 and support a 5G network communication through the established communication channel. According to various embodiments, the second network 294 may be a 5G network defined by the 3GPP. Additionally, according to an embodiment, the first communication processor 212 or the second communication processor 214 may establish a communication channel corresponding to another specified band (e.g., about 6 GHz or less) out of the band to be used for the wireless communication with the second network 294 and support a 5G network communication through the established communication channel.

The first communication processor 212 may transmit and receive data to and from the second communication processor 214. For example, data supposed to be transmitted through a second cellular network 294 may be scheduled to be transmitted through a first cellular network 292. In this case, the first communication processor 212 may receive transmission data from the second communication processor 214.

For example, the first communication processor 212 may transmit and receive data to and from the second communication processor 214 through an inter-processor interface 213. The inter-processor interface 213 may be configured as, but not limited to, a universal asynchronous receiver/transmitter (UART) (e.g., high speed-UART (HS-UART)) interface or a peripheral component interconnect bus express (PCIe) interface. Alternatively, the first communication processor 212 and the second communication processor 214 may exchange control information and packet data information by means of, for example, a shared memory. The first communication processor 212 may transmit and receive various pieces of information such as sensing information, information about output strength, and resource block (RB) allocation information to and from the second communication processor 214.

Depending on their implementation, the first communication processor 212 may not be coupled directly to the second communication processor 214. In this case, the first communication processor 212 may transmit and receive data to and from the second communication processor 214 through the processor 120 (e.g., an application processor). For example, the first communication processor 212 may transmit and receive data to and from the second communication processor 214 through the processor 120 (e.g., the application processor), an HS-UART interface or a PCIe interface, and a type of an interface is not limited. Alternatively, the first communication processor 212 may exchange control information and packet data information with the second communication processor 214 using the processor 120 (e.g., the application processor) and a shared memory.

Figure 2B:
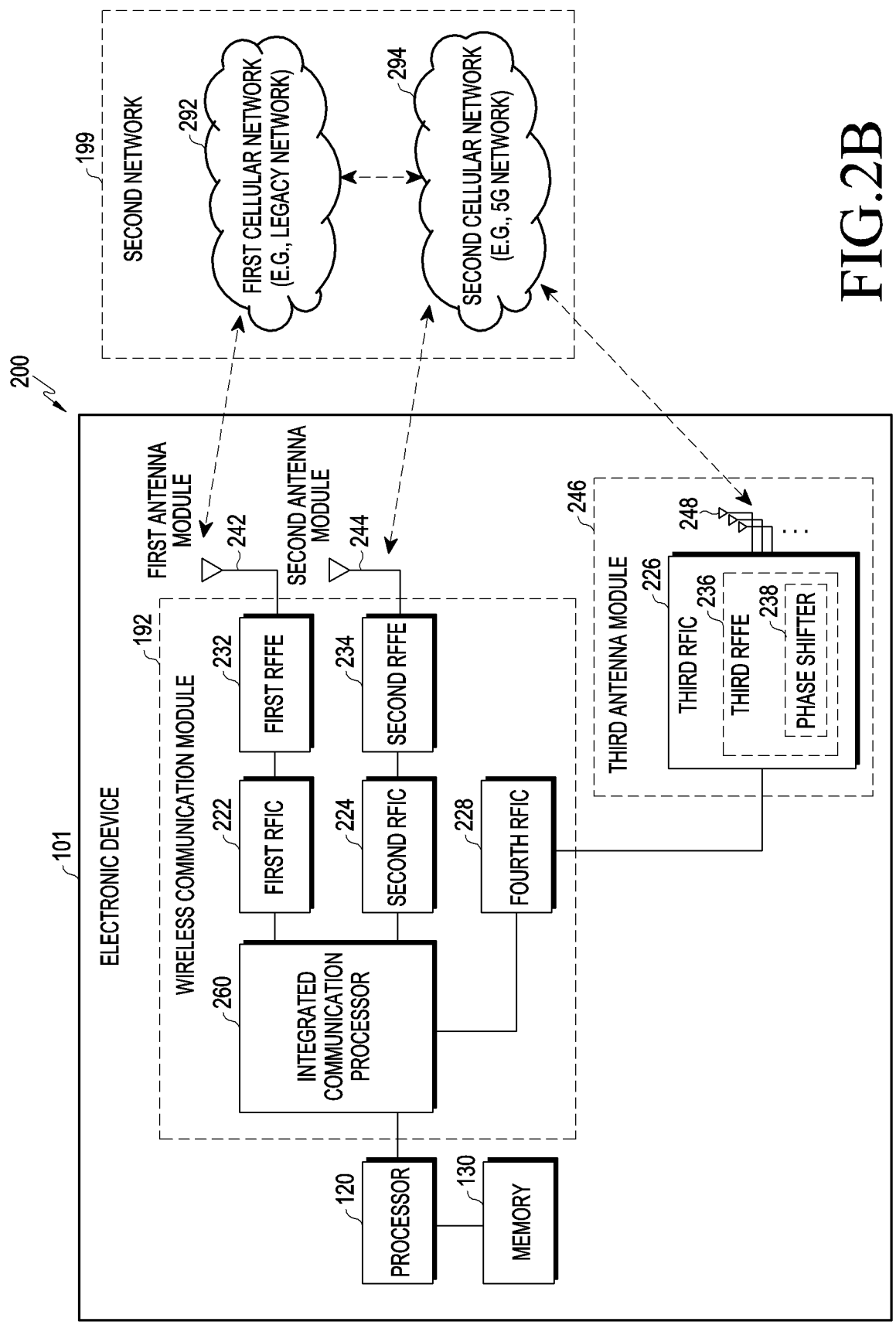
FIG. 2B illustrates a block diagram of an electronic device for supporting a legacy network communication and a 5G network communication according to various embodiments.

According to an embodiment, the first communication processor 212 and the second communication processor 214 may be incorporated in a single chip or a single package. According to various embodiments, the first communication processor 212 or the second communication processor 214 may be incorporated together with the processor 120, an auxiliary processor 123, or a communication module 190 in a single chip or a single package. For example, as illustrated in FIG. 2B, an integrated communication processor 260 may support all of functions for a communication with the first cellular network 292 and the second cellular network 294.

For transmission, the first RFIC 222 may convert a baseband signal generated by the first communication processor 212 to an RF signal in about 700 MHz to about 3 GHz used in the first network 292 (e.g., the legacy network). For reception, an RF signal may be obtained from the first network 292 (e.g., the legacy network) through an antenna (e.g., the first antenna module 242) and pre-processed through an RFFE (e.g., the first RFFE 232). The first RFIC 222 may convert the pre-processed RF signal to a baseband signal so that the baseband signal may be processed by the first communication processor 212.

For transmission, the second RFIC 224 may convert a baseband signal generated by the first communication processor 212 or the second communication processor 214 to an RF signal in a Sub6 band (e.g., about 6 GHz or less) used in the second network 294 (e.g., the 5G network). For reception, a 5G Sub6 RF signal may be obtained from the second network 294 (e.g., the 5G network) through an antenna (e.g., the second antenna module 244) and pre-processed in an RFFE (e.g., the second RFFE 234). The second RFIC 224 may convert the pre-processed 5G Sub6 RF signal to a baseband signal so that the baseband signal may be processed by a corresponding one between the first communication processor 212 and the second communication processor 214.

For transmission, the third RFIC 226 may convert a baseband signal generated by the second communication processor 214 to an RF signal (hereinafter, referred to as, a 5G Above6 RF signal) in a 5G Above6 band (e.g., about 6 GHz to about 60 GHz) to be used in the second network 294 (e.g., the 5G network). For reception, a 5G Above6 RF signal may be obtained from the second network 294 (e.g., the 5G network) through an antenna (e.g., the antenna 248) and pre-processed through the third RFFE 236. The third RFIC 226 may convert the pre-processed 5G Above6 RF signal to a baseband signal so that the baseband signal may be processed by the second communication processor 214. According to an embodiment, the third RFFE 236 may be formed as part of the third RFIC 226.

According to an embodiment, the electronic device 101 may include the fourth RFIC 228 separately from or as part of the third RFIC 226. In this case, the fourth RFIC 228 may convert a baseband signal generated by the second communication processor 214 to an RF signal in an intermediate frequency band (e.g., about 9 GHz to about 11 GHz) (hereinafter, referred to as an intermediate frequency (IF) signal), and provide the IF signal to the third RFIC 226. The third RFIC 226 may convert the IF signal to a 5G Above6 RF signal. During reception, a 5G Above6 RF signal may be received from the second network 294 (e.g., the 5G network) through an antenna (e.g., the antenna 248) and converted to an IF signal by the third RFIC 226. The fourth RFIC 228 may convert the IF signal to a baseband signal so that the baseband signal may be processed by the second communication processor 214.

According to an embodiment, the first RFIC 222 and the second RFIC 224 may be implemented as at least part of a single chip or a single package. According to an embodiment, the first RFFE 232 and the second RFFE 234 may be implemented as at least part of a single chip or a single package. According to an embodiment, at least one of the first antenna module 242 or the second antenna module 244 may be omitted or combined with the other antenna module to process RF signals in a plurality of corresponding bands.

According to an embodiment, the third RFIC 226 and the antenna 248 may be arranged on the same substrate to form a third antenna module 246. For example, the wireless communication module 192 or the processor 120 may be arranged on a first substrate (e.g., a main PCB). In this case, the third RFIC 226 may be arranged in a partial area (e.g., the bottom surface) of a second substrate (e.g., a sub PCB) other than the first substrate and the antenna 248 may be arranged in another partial area (e.g., the top surface) of the second substrate, to form the third antenna module 246. As the third RFIC 226 and the antenna 248 are arranged on the same substrate, it is possible to reduce length of a transmission line between the third RFIC 226 and the antenna 248. This may reduce, for example, loss (e.g., attenuation) of a signal in a high frequency band (e.g., about 6 GHz to about 60 GHz) used for a 5G network communication, on the transmission line. Therefore, the electronic device 101 may increase quality or a speed of a communication with the second network 294 (e.g., the 5G network).

According to an embodiment, the antenna 248 may be formed as an antenna array including a plurality of antenna elements which may be used for beamforming. In this case, for example, the third RFIC 226 may include a plurality of phase shifters 238 corresponding to the plurality of antenna elements, as part of the third RFFE 236. During transmission, each of the plurality of phase shifters 238 may change a phase of a 5G Above6 RF signal to be transmitted to the outside of the electronic device 101 (e.g., a base station in the 5G network) through a corresponding antenna element. During reception, each of the phase shifters 238 may change a phase of a 5G Above6 RF signal received from the outside through a corresponding antenna element to the same or substantially same phase. This enables transmission or reception through beamforming between the electronic device 101 and the outside.

The second network 294 (e.g., the 5G network) may be operated independently of the first network 292 (e.g., the legacy network) (e.g., SA (Stand-Alone)) or in connection to the first network 292 (e.g., the legacy network) (e.g., Non-Stand Alone (NSA)). For example, the 5G network may include only an access network (e.g., a 5G radio access network (RAN) or next generation RAN (NG RAN)) without a core network (e.g., a next generation core (NGC)). In this case, after accessing the access network of the 5G network, the electronic device 101 may access an external network (e.g., an Internet) under the control of a core network (e.g., an evolved packet core (EPC)) of the legacy network. Protocol information for a communication with the legacy network (e.g., LTE protocol information) and protocol information for a communication with the 5G network (e.g., New Radio (NR) protocol information) may be stored in the memory 130 and accessed by another component (e.g., the processor 120, the first communication processor 212, or the second communication processor 214).

Figure 3:
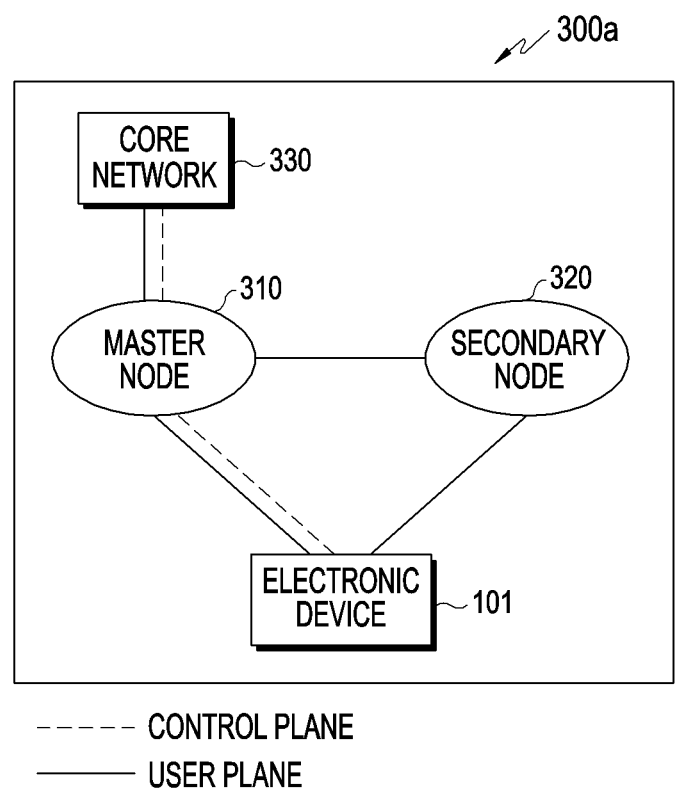
FIG. 3 illustrates a diagram of a wireless communication system which provides a legacy communication network and/or a 5G communication network according to various embodiments.

FIG. 3 illustrates a diagram of a wireless communication system which provides a legacy communication network and/or a 5G communication network. Referring to FIG. 3, a network environment 300a may include at least one of a legacy network or a 5G network. The legacy network may include, for example, a 4G or LTE base station (e.g., an eNB or eNodeB) of the 3GPP standard supporting a wireless access of the electronic device 101, and an EPC which manages a 4G communication. The 5G network may include, for example, an NR base station (e.g., gNB or gNodeB) supporting a wireless access of the electronic device 101, and a 5th generation core (5GC) which manages a 5G communication of the electronic device 101.

According to various embodiments, the electronic device 101 may transmit and receive a control message and user data through a legacy communication and/or 5G communication. The control message may include a message related to at least one of, for example, security control, bearer setup, authentication, registration, or mobility management of the electronic device 101. The user data may refer to, for example, user data except for a control message transmitted and received between the electronic device 101 and a core network 330 (e.g., the EPC).

Referring to FIG. 3, the electronic device 101 according to an embodiment may transmit and receive at least one of a control message or user data to and from at least part (e.g., an NR base station and a 5GC) of the 5G network using at least part (e.g., an LTE base station and an EPC) of the legacy network.

According to various embodiments, the network environment 300a may include a network environment which provides wireless communication dual connectivity (DC) to the LTE base station and the NR base station and transmits and receives a control message to and from the electronic device 101 through one core network 330 of the EPC or the 5GC 352.

According to various embodiments, in a DC environment, one of the LTE base station and the NR base station may operate as a master node (MN) 310 and the other may operate as a secondary node (SN) 320. The MN 310 may be connected to the core network 330 and transmit and receive a control message to and from the core network 330. The MN 310 and the SN 320 may be connected to each other through a network interface and transmit and receive a message related to management of a wireless resource (e.g., a communication channel) to and from each other.

According to various embodiments, the MN 310 may include the LTE base station, the SN 320 may include the NR base station, and the core network 330 may include the EPC. For example, a control message may be transmitted and received through the LTE base station and the EPC, and user data may be transmitted through at least one of the LTE base station or the NR base station.

According to various embodiments, the MN 310 may include the NR base station, the SN 320 may include the LTE base station, and the core network 330 may include the 5GC. For example, a control message may be transmitted and received through the NR base station and the 5GC, and user data may be transmitted through at least one of the LTE base station or the NR base station.

According to various embodiments, the electronic device 101 may be registered in at least one of the EPC or the 5GC, and transmit and receive a control message.

According to various embodiments, the EPC and the 5GC may interwork and manage a communication of the electronic device 101.

As described above, dual connectivity through an LTE base station and an NR base station may be referred to as E-UTRA new radio dual connectivity (EN-DC). Meanwhile, MR DC may be variously applied in addition to EN-DC. For example, a first network and a second network by the MR DC are all related to an LTE communication, and the second network may be a network which corresponds to a small-cell of a specific frequency. For example, the first network and the second network by the MR DC are all related to 5G, the first network may correspond to a frequency band below 6 GHz (e.g., below 6), and the second network may correspond to a frequency band of 6 GHz or above (e.g., over 6). In addition to the above-described examples, those skilled in the art will readily understand that a network structure may be applied to various embodiments of the present disclosure as long as dual connectivity may be applied to the network structure.

Figure 4:
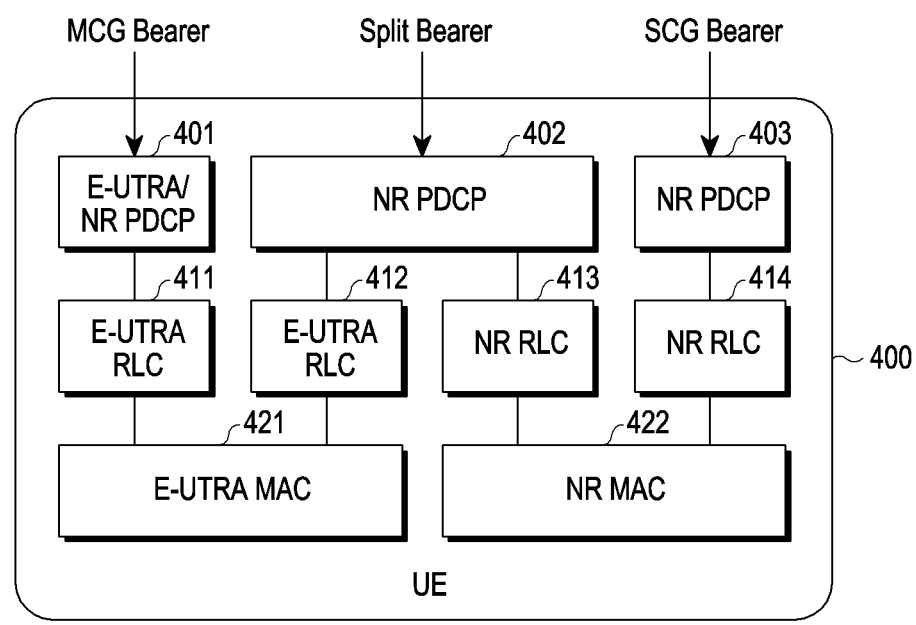
FIG. 4 illustrates a diagram for describing a bearer at a UE according to various embodiments.

FIG. 4 illustrates a diagram for describing a bearer at a UE according to various embodiments.

Bearers available in a 5G non-standalone network environment (e.g., a network environment 300a in FIG. 3) may include a master cell group (MCG) bearer, a secondary cell group (SCG) bearer, and a split bearer. An E-UTRA/NR packet data convergence protocol (PDCP) entity 401 and NR PDCP entities 402 and 403 may be configured to a user equipment (UE) 400. An E-UTRA radio link control (RLC) entities 411 and 412 and NR RLC entities 413 and 414 may be configured to the UE 400. An E-UTRA MAC entity 421 and an NR MAC entity 422 may be configured to the UE 400. A UE may refer to a user device capable of communicating with a base station and may be interchangeably used with the electronic device 101 of FIG. 1. For example, in various embodiments, when it is said that the UE performs a specific operation, this may imply that at least one component included in the electronic device 101 performs the specific operation.

An MCG may correspond to, for example, an MN 310 in FIG. 3, and an SCG may correspond to, for example, an SN 320 in FIG. 3. Once a node to perform a communication is determined, the UE 400 may configure various entities illustrated in FIG. 4 to communicate with the determined node (e.g., a base station). The entities 401, 402 and 403 of a PDCP layer may receive data (e.g., a PDCP service data unit (SDU) corresponding to an IP packet) and output converted data (e.g., a PDCP protocol data unit (PDU)) in which additional information (e.g., header information) is reflected. The entities 411, 412, 413, and 414 of an RLC layer may receive the converted data (e.g., the PDCP PDU) output from the entities 401, 402 and 403 of the PDCP layer and output converted data (e.g., an RLC PDU) in which additional information (e.g., header information) is reflected. The entities 421 and 422 of a MAC layer may receive the converted data (e.g., the RLC PDU) output from the entities 411, 412, 413, and 414 of the RLC layer and output converted data (e.g., a MAC PDU) in which additional information (e.g., header information) is reflected to a physical layer (not shown).

In dual connectivity (DC), an MCG bearer may be associated with a path (or data) in which data may be transmitted and received only using a resource or an entity which corresponds to an MN. In the dual connectivity, an SCG bearer may be associated with a path (or data) in which data may be transmitted and received only using a resource or an entity which corresponds to an SN. In the dual connectivity, a split bearer may be associated with a path (or data) in which data may be transmitted and received using the resource or the entity which corresponds to the MN or the resource or the entity which corresponds to the SN. Accordingly, as illustrated in FIG. 4, the split bearer may be associated with all of the E-UTRA RLC entity 412, the NR RLC entity 413, the E-UTRA MAC entity 421, and the NR MAC entity 422 through the NR PDCP entity 402.

In the following description, EN-DC is described as a specific example of dual connectivity, but the present disclosure is not limited to EN-DC described later, and may be applied to various types of dual connectivity.

Figure 5:
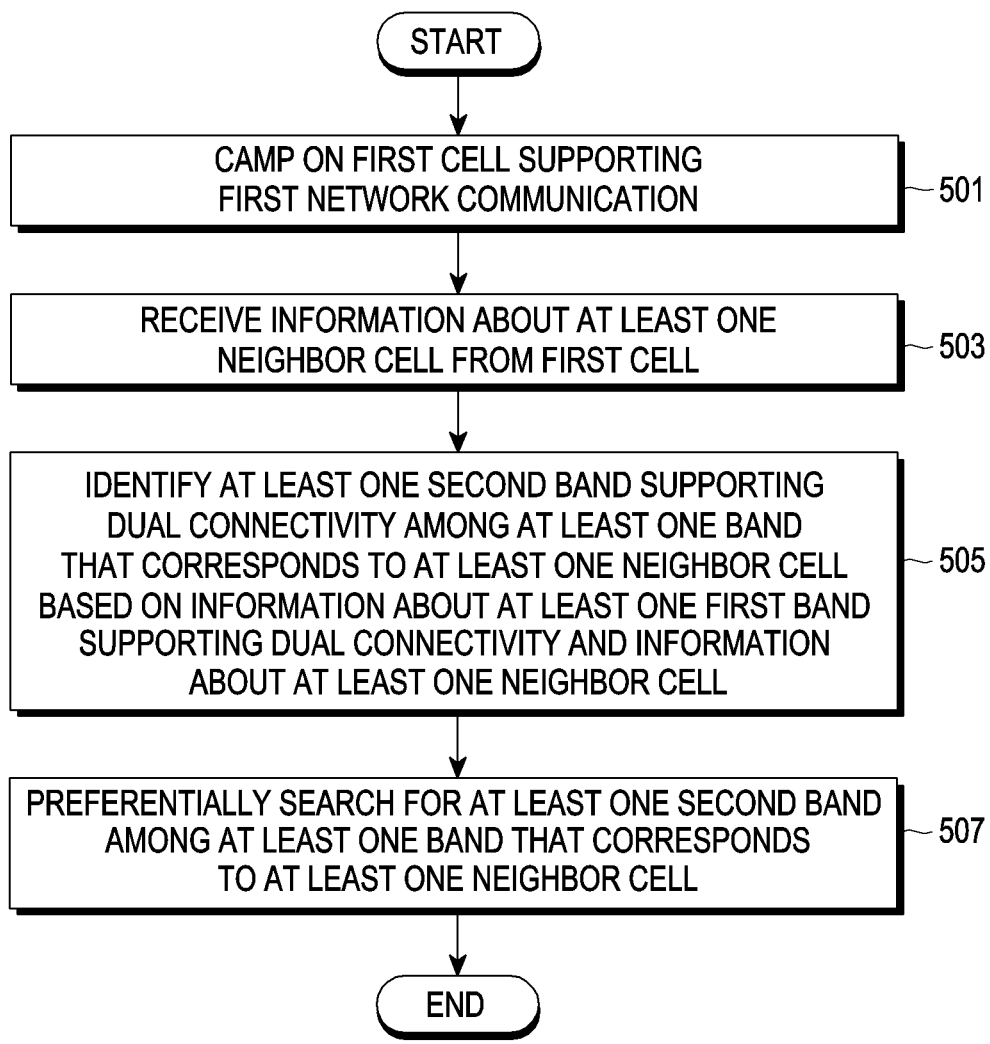
FIG. 5 illustrates a flowchart for describing an operating method of an electronic device according to various embodiments.
Figure 6A:
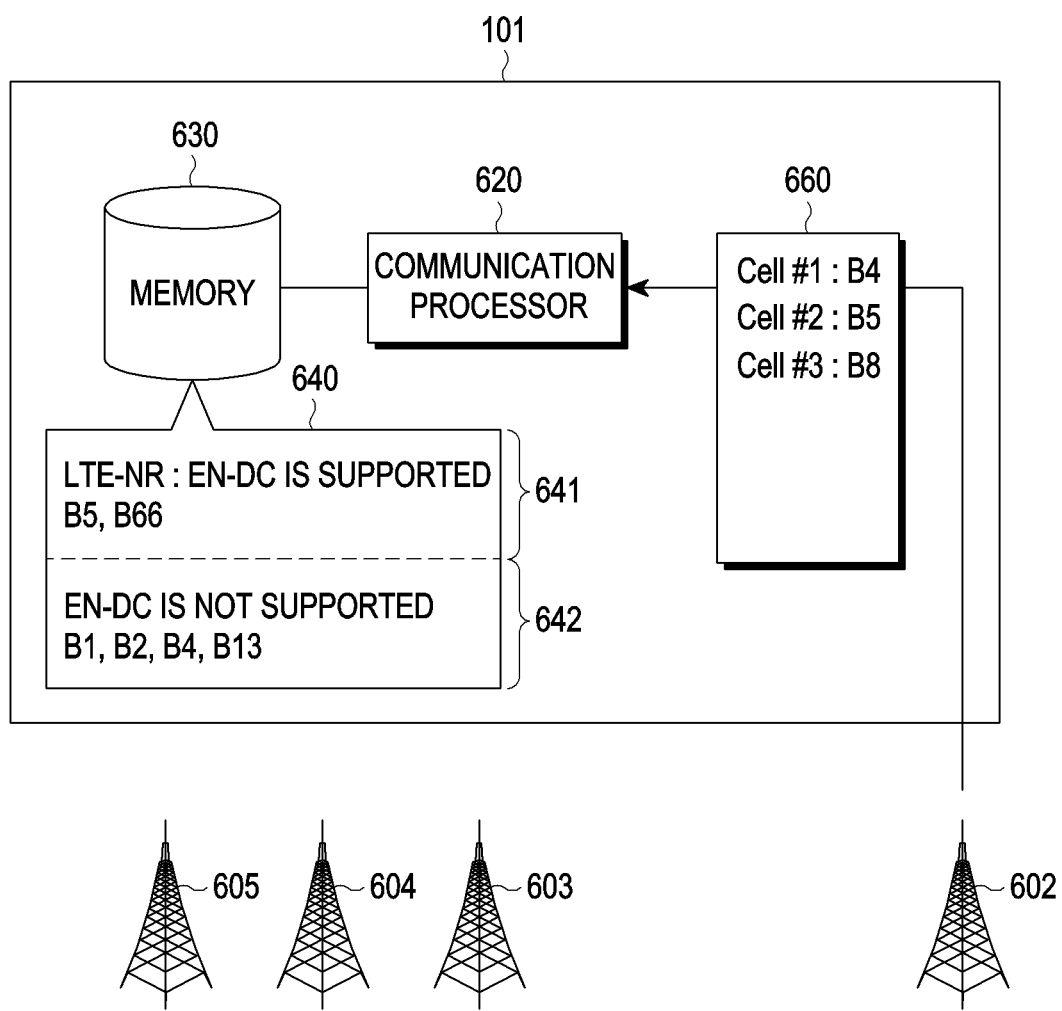
FIG. 6A illustrates a diagram for describing an operation of an electronic device according to various embodiments.

FIG. 5 illustrates a flowchart for describing an operating method of an electronic device according to various embodiments. An embodiment of FIG. 5 will be described with reference to FIG. 6A. FIG. 6A illustrates a diagram for describing an operation of an electronic device according to various embodiments.

According to various embodiments, an electronic device 101 (e.g., at least one of a first communication processor 212, a second communication processor 214, or an integrated communication processor 260) may camp on a first cell which supports a first network communication in operation 501. For example, if the electronic device 101 is turned on, a public land mobile network (PLMN) may be selected, for example, by a non-access stratum (NAS). The PLMN may be selected automatically or manually, and there is no limitation to a selection scheme. The electronic device 101 may search for a suitable cell in the selected PLMN. The suitable cell may be a cell on which the electronic device 101 may camp. For a criterion for this, reference may be made to, for example, 3GPP TS 36.304 or 3GPP TS 38.304. The electronic device 101 may perform a search for each frequency and select a suitable cell based on the search result. If a suitable cell is not searched in at least one selected PLMN, the electronic device 101 may camp on any cell which belongs to any PLMN. For initial selection for the first cell, for example, according to 3GPP TS 38.304, a cell selection RX level value (hereinafter, referred to as Srxlev) may be greater than 0 and a cell selection quality value (hereinafter, referred to as Squal) may be greater than 0, however there is no limitation to an initial selection process. The electronic device 101 may camp on the first cell based on the search result. According to various embodiments, "camp on" may include an operation of selecting a cell capable of providing an available service and monitoring at least one of a control channel or system information of the cell. According to various embodiments, the cell on which the electronic device 101 camps may be referred to as a serving cell. According to various embodiments, the electronic device 101 may support a plurality of network communications (e.g., an LTE communication and an NR communication). In operation 501, the electronic device 101 may camp on the first cell based on, for example, a first network communication (e.g., the LTE communication).

According to various embodiments, the electronic device 101 may receive information about at least one neighbor cell from the first cell in operation 503. For example, the electronic device 101 may receive the system information including the information about the at least one neighbor cell broadcasted by the first cell. According to various embodiments, the system information including the information about the neighbor cell may be one of an SIB4, an SIB5, or an SIB23. According to various embodiments, the system information including the information about the neighbor cell included in one of the SIB4, the SIB5, or the SIB23 may include at least one of information about at least one frequency on which the neighbor cell may exist, priority information for the at least one frequency, or Radio Access Technology (RAT) information of the at least one frequency. According to various embodiments, the system information including the information about the neighbor cell may be an SIB3. According to various embodiments, the system information including the information about the neighbor cell may include at least one of information related to hysteresis for a measurement value of the serving cell and the neighbor cell for cell reselection, a criterion of the serving cell and the neighbor cell for determining whether to perform a cell reselection process, or a criterion of the serving cell for determining whether to perform a measurement process for the cell reselection.

According to various embodiments, the electronic device 101 may perform a search for at least one frequency for cell reselection. The cell reselection may refer to a process causing the electronic device 101 to select a more suitable cell than a currently camped-on serving cell to camp on the more suitable cell. For example, the electronic device 101 may perform the search for the at least one frequency based on the information about the neighbor cell received from the first cell and/or a cell reselection criterion. For example, one of purposes to camp on a cell in an RRC_IDLE state or an RRC_INACTIVE state may be to receive system information from a base station.

According to various embodiments, the electronic device 101 may receive a system information block (SIB) from the camped on-first cell. For example, the electronic device 101 may receive a system information block 4 (SIB4) and/or a system information block 5 (SIB5) from the first cell. In various embodiments, the SIB 4 and/or the SIB5 may include configuration information of neighbor cells, and a list of the neighbor cells may be referred to as a neighbor cell list. For example, the SIB 4 may include information about an intra-frequency carrier frequency. The SIB5 may include information about an inter-frequency carrier frequency. In various embodiments, the electronic device 101 may receive, from the first cell, at least one of information about a frequency or information about a bandwidth of a search target for a neighbor cell. For example, "InterFreqCarrierFreqInfo" of the SIB5 may include at least one of information about an inter-frequency carrier frequency or information about a bandwidth. The electronic device 101 may identify a frequency of a search target based on at least one of the information about the inter-frequency carrier frequency or the information about the bandwidth. In various embodiments of the present disclosure, an operation of receiving information about a neighbor cell may include not only an operation of receiving an explicit neighbor cell list, but also an operation of receiving information about a frequency of a search target. For example, the SIB5 may include information about a cell reselection priority (or information about a priority for a frequency), and an operation based on the priority will be described later. According to various embodiments, a system information block (e.g., the SIB5) received from the first cell may further include a cell reselection criterion (e.g., at least one of at least one threshold value related to signal strength of a serving cell or a neighbor cell).

For example, as illustrated in FIG. 6A, an electronic device 101 may receive information 660 about a neighbor cell from a camped-on first cell 602. The information 660 about the neighbor cell may include, for example, a supported band (e.g., an LTE B4 band) of a first neighbor cell (e.g., a cell #1) 603, a supported band (e.g., an LTE B5 band) of a second neighbor cell (e.g., a cell #2) 604, and a supported band (e.g., an LTE B8 band) of a third neighbor cell (e.g., a cell #3) 605. In FIG. 6A, a band identification number is shown, but this is exemplary and the information 660 about the neighbor cell may be expressed in a frequency in a Hz unit as well as the band identification number. If the information 660 about the neighbor cell is expressed in a frequency unit (for example, if inter-frequency carrier frequency information is included), the electronic device 101 may identify a frequency which corresponds to a band supporting dual connectivity. The electronic device 101 may store at least one of information about a frequency per band or information for identifying a frequency, and may also identify a frequency supporting dual connectivity based on this. Alternatively, the electronic device 101 may store information about the frequency supporting the dual connectivity. In this case, the electronic device 101 may identify a frequency supporting the dual connectivity among a frequency included in the information 660 about the neighbor cell based on the stored information. As described above, the information 660 about the neighbor cell may be implemented so that explicit information for indicating the neighbor cell is not included. In this case, the information 660 about the neighbor cell may be expressed by information about a search target frequency (e.g., an inter-frequency carrier frequency and/or bandwidth).

Figure 6B:
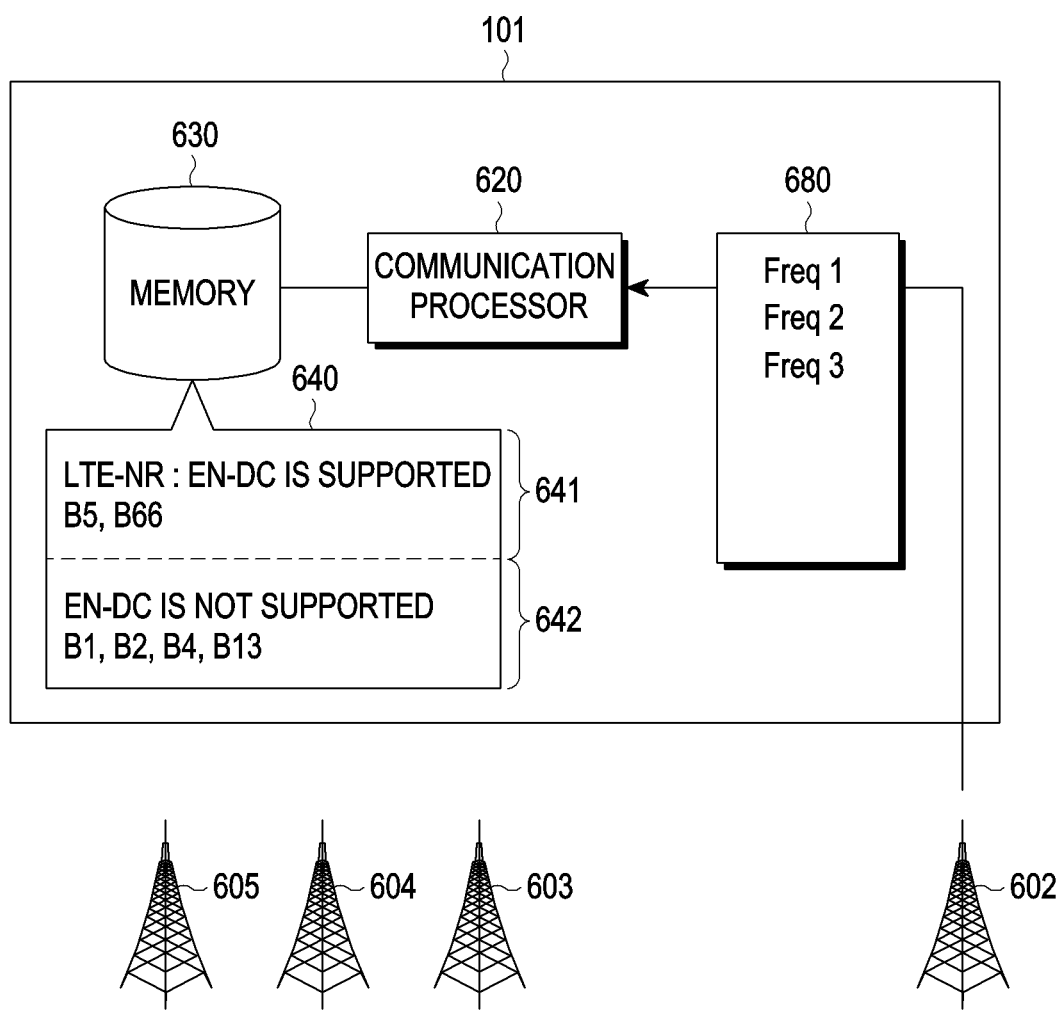
FIG. 6B illustrates a diagram for describing an operation of an electronic device according to various embodiments.

FIG. 6B illustrates a diagram for describing a case of receiving information about a neighbor cell including an inter-frequency carrier frequency according to various embodiments. Referring to FIG. 6B, an electronic device 101 may receive information 680 about a neighbor cell from a camped-on first cell 602. The information 680 about the neighbor cell may include, for example, Freq. 1 (e.g., an LTE B4 band), Freq. 2 (e.g., an LTE B5 band), and Freq. 3 (e.g., an LTE B8 band). The electronic device 101 may identify a frequency supporting dual connectivity among frequencies (e.g., the Freq. 1, the Freq. 2, and the Freq. 3) included in the received information 680. For example, the electronic device 101 may identify that a frequency corresponding to a band (e.g., an LTE B5 band) supporting the dual connectivity is the Freq. 2, and then identify the Freq. 2 as a frequency supporting the dual connectivity. In FIG. 6B, a band identification number is shown, but this is exemplary, and the band identification number may be expressed in one of an E-UTRA Absolute Radio Frequency Channel Number (EARFCN) or an Absolute Radio Frequency Channel Number (NR-ARFCN).

In various embodiments, according to a definition of the 3GPP standard, a frequency band indicated by one band identification number may include a frequency band indicated by at least one frequency identification number. According to various embodiments, a frequency identification number may be an NR-Absolute Radio Frequency Channel Number (ARFCN), and an actual frequency value may be calculated using Equation (1) based on Table 1 and Table 2.

$$F_{REF} = F_{REF\text{-}Offs} + \Delta F_{Global}(N_{REF} - N_{REF\text{-}Offs}) \quad \text{Equation (1)}$$

In Equation (1), $F_{REF}$ may be a reference frequency, and $NR_{REF}$ may be an NR-ARFCN. In Equation (1), $F_{REF\text{-}Offs}$, $\Delta F_{Global}$, and $N_{REF\text{-}Offs}$ may be set as Table 1 and Table 2.

TABLE 1

| Frequency range (MHz) | $\Delta F_{Global}$ (kHz) | $F_{REF\text{-}Offs}$ (MHz) | $N_{REF\text{-}Offs}$ | Range of $N_{REF}$ |
|---|---|---|---|---|
| 0-3000 | 5 | 0 | 0 | 0-599999 |
| 3000-24250 | 15 | 3000 | 600000 | 600000-2016666 |

TABLE 2

| Frequency range (MHz) | $\Delta F_{Global}$ (kHz) | $F_{REF\text{-}Offs}$ (MHz) | $N_{REF\text{-}Offs}$ | Range of $N_{REF}$ |
|---|---|---|---|---|
| 24250-100000 | 60 | 24250.08 | 2016667 | 2016667-3279165 |

According to various embodiments, a relationship between the band identification number (NR Operating Band in Table 3) and the NR-ARFCN ($N_{REF}$ in Table 3) may be shown in Table 3.

TABLE 3

| NR Operating Band | $\Delta F_{Raster}$ (kHz) | Uplink Range of $N_{REF}$ (First-\<Step size\>-Last) | Downlink Range of $N_{REF}$ (First-\<Step size\>-Last) |
|---|---|---|---|
| n1 | 100 | 384000-\<20\>-396000 | 422000-\<20\>-434000 |
| n2 | 100 | 370000-\<20\>-382000 | 386000-\<20\>-398000 |
| n3 | 100 | 342000-\<20\>-357000 | 361000-\<20\>-376000 |
| n5 | 100 | 164800-\<20\>-169800 | 173800-\<20\>-178800 |
| n7 | 100 | 500000-\<20\>-514000 | 524000-\<20\>-538000 |
| n8 | 100 | 176000-\<20\>-183000 | 185000-\<20\>-192000 |
| ... | | | |
| n77 | 15 | 620000-\<1\>-680000 | 620000-\<1\>-680000 |
|  | 30 | 620000-\<2\>-680000 | 620000-\<2\>-680000 |
| n78 | 15 | 620000-\<1\>-653333 | 620000-\<1\>-653333 |
|  | 30 | 620000-\<2\>-653332 | 620000-\<2\>-653332 |
| n79 | 15 | 693334-\<1\>-733333 | 693334-\<1\>-733333 |
|  | 30 | 693334-\<2\>-733332 | 693334-\<2\>-733332 |
| n80 | 100 | 342000-\<20\>-357000 | N/A |
| n81 | 100 | 176000-\<20\>-183000 | N/A |
| n82 | 100 | 166400-\<20\>-172400 | N/A |
| n83 | 100 | 140600-\<20\>-149600 | N/A |
| n84 | 100 | 384000-\<20\>-396000 | N/A |
| n86 | 100 | 342000-\<20\>-356000 | N/A |
| n257 | 60 | 2054166-\<1\>-2104165 | 2054166-\<1\>-2104165 |
|  | 120 | 2054167-\<2\>-2104165 | 2054167-\<2\>-2104165 |
| n258 | 60 | 2016667-\<1\>-2070832 | 2016667-\<1\>-2070832 |
|  | 120 | 2016667-\<2\>-2070831 | 2016667-\<2\>-2070831 |
| n260 | 60 | 2229166-\<1\>-2279165 | 2229166-\<1\>-2279165 |
|  | 120 | 2229167-\<2\>-2279165 | 2229167-\<2\>-2279165 |
| n261 | 60 | 2070833-\<1\>-2084999 | 2070833-\<1\>-2084999 |
|  | 120 | 2070833-\<2\>-2084999 | 2070833-\<2\>-2084999 |

According to various embodiments, a relationship between the band identification number (E-UTRA Operating Band in Table 4) and an E-UTRA Absolute Radio Frequency Channel Number (EARFCN) of the LTE band ($N_{DL}$ and $N_{UL}$ in Table 4) may be shown in Table 4.

TABLE 4

| E-UTRA Operating Band | Downlink | | | Uplink | | |
|---|---|---|---|---|---|---|
|  | $F_{DL\_low}$ (MHz) | $N_{Offs-DL}$ | Range of $N_{DL}$ | $F_{UL\_low}$ (MHz) | $N_{Offs-UL}$ | Range of $N_{UL}$ |
| 1 | 2110 | 0 | 0-599 | 1920 | 18000 | 18000-18599 |
| 2 | 1930 | 600 | 600-1199 | 1850 | 18600 | 18600-19199 |
| 3 | 1805 | 1200 | 1200-1949 | 1710 | 19200 | 19200-19949 |
| 4 | 2110 | 1950 | 1950-2399 | 1710 | 19950 | 19950-20399 |
| 5 | 869 | 2400 | 2400-2649 | 824 | 20400 | 20400-20649 |
| 6 | 875 | 2650 | 2650-2749 | 830 | 20650 | 20650-20749 |
| ... | | | | | | |
| 72 | 461 | 68936 | 68936-68985 | 451 | 133472 | 133472-133521 |
| 73 | 460 | 68986 | 68986-69035 | 450 | 133522 | 133522-133571 |
| 74 | 1475 | 69036 | 69036-69465 | 1427 | 133572 | 133572-134001 |
| 75[2] | 1432 | 69466 | 69466-70315 |  | N/A |  |
| 76[2] | 1427 | 70316 | 70316-70365 |  | N/A |  |
| 85 | 728 | 70366 | 70366-70545 | 698 | 134002 | 134002-134181 |

Referring back to FIG. 5, according to various embodiments, the electronic device 101 may identify at least one second band supporting the dual connectivity among at least one band which corresponds to the at least one neighbor cell based on information about at least one first band supporting the dual connectivity and the information about the at least one neighbor cell in operation 505. If the information 660 about the neighbor cell is expressed in a frequency unit (e.g., an ARFCN or an NR-ARFCN) (for example, if inter-frequency carrier frequency information is included), the electronic device 101 may identify a frequency which corresponds to a band supporting the dual connectivity. The electronic device 101 may store at least one of information about frequency per band or information for identifying a frequency, and may also identify a frequency supporting the dual connectivity based on this.

According to various examples, referring to FIG. 5, according to various embodiments, the electronic device 101 may identify at least one second band supporting the dual connectivity among at least one band which corresponds to a frequency of the at least one neighbor cell based on information about at least one first band supporting the dual connectivity and frequency information for one neighbor cell included in the received system information in operation 505.

For example, as shown in FIG. 6A, a memory 630 (e.g., a memory 130 and/or a dedicated memory of a communication processor 620) may store information 640 related to a band (or a frequency) supporting the dual connectivity. The communication processor 620 may include at least one of a first communication processor 212, a second communication processor 214, or an integrated communication processor 260. The information 640 related to the band supporting the dual connectivity may be determined based on at least one of a communication provider, a manufacturer, or standard, and stored in the memory 630. The information 640 stored in the memory 630 may be stored at the time of manufacture, but may be updated later, and updated information may be received from the outside. For example, in communication, the electronic device 101 may receive information from a base station, and use this to update previously stored information. Alternatively, the information 640 stored in the memory 630 may be information which is received from the outside when the electronic device 101 is opened and stored in the memory 630. The information 640 may be stored, for example, as a capability (e.g., a UE capability) of the electronic device 101, but there is no limitation to a stored format or path. According to various embodiments, if the information 640 related to the band supporting the dual connectivity is not separately defined by a communication provider or a manufacturer, the information 640 may follow 3GPP standard (e.g., 3GPP TS 38.101) information. According to various embodiments, in the 3GPP standard, information related to a band supporting the dual connectivity may be defined as shown in examples in Table 5 and Table 6.

TABLE 5

| EN-DC band | E-UTRA Band | NR Band |
|---|---|---|
| DC_(n)71 | 71 | n71 |
| DC_3_n3 | 3 | n3 |

TABLE 5-continued

| EN-DC band | E-UTRA Band | NR Band |
| --- | --- | --- |
| DC__1__n28 | 1 | n28 |
| DC__1__n40 | 1 | n40 |
| ... | | |
| DC__42__n77[5] | 42 | n77 |
| DC__42__n78[5] | 42 | n78 |
| ... | | |
| DC__1__n257 | 1 | n257 |
| DC__2-2__n257 | CA__2-2 | n257 |
| DC__2__n257 | CA__2 | n257 |
| DC__2__n260 | 2 | n260 |
| ... | | |
| DC__1-3__n257[1] | CA__1-3 | n257 |
| DC__1-5__n257[1] | CA__1-5 | n257 |

TABLE 6

| NR-DC Band | NR Band |
| --- | --- |
| DC__n77-n257 | n77, n257 |
| DC__n78-n257 | n78, n257 |
| DC__n79-n257 | n79, n257 |

According to various embodiments, the information 640 related to the band supporting the dual connectivity may include information 641 about at least one band supporting the dual connectivity (e.g., LTE-NR ENDC) and information 642 about a band which does not support the dual connectivity. The electronic device 101 may identify at least one band (e.g., a B5 band) supporting the dual connectivity among at least one band (e.g., B4, B5, and B8 bands) which corresponds to the information 660 about the neighbor cell based on the information 641 about the at least one band supporting the dual connectivity. Meanwhile, in relation to an embodiment of FIG. 6A, whether the dual connectivity is supported is expressed in a band identifier number, but this is exemplary, and whether the dual connectivity is supported may be expressed in a frequency unit.

According to various embodiments, the electronic device 101 may identify a frequency supporting the dual connectivity among inter-frequency carrier frequencies within the received SIB5. According to various embodiments, the electronic device 101 may identify that corresponding frequencies indicate which bands using EARFCN or NR-ARFCN information for the inter-frequency carrier frequencies within the received SIB5, and/or Table 3 and Table 4.

Those skilled in the art will understand that, in various embodiments of the present disclosure, a fact that the electronic device 101 performs a specific operation on any band may be understood as a fact that the electronic device 101 performs the specific operation on a frequency included in the band. Accordingly, an operation of using the information about the at least one first band supporting the dual connectivity and the information about the at least one neighbor cell in operation 505 may be understood as an operation of using a compared result between at least one frequency allocated for the dual connectivity and a received inter-frequency carrier frequency.

Referring back to FIG. 5, according to various embodiments, the electronic device 101 may preferentially search for at least one second band among at least one band which corresponds to at least one neighbor cell in operation 507. For example, the electronic device 101 may preferentially search for the at least one band (e.g., the B5 band) supporting the dual connectivity identified in an embodiment of FIG. 6A. Here, a search for a band may mean an operation of measuring at least one of reference signal received power (RSRP), reference signal received quality (RSRQ), or a received signal strength indicator (RSSI) of a communication signal from any cell supporting a frequency included in the band. A measurement rule may be defined in, for example, 3GPP TS36.304 or 3GPP TS38.304, but is not limited thereto. In addition, a prior search for a specific band may mean an example of setting a search priority of the specific band to a priority higher than other bands, an example of setting search time of the specific band to search time longer than the other bands, or an example of setting the number of searches of the specific band to the number of searches greater than the other bands, or may represent a combination of examples of the above-described prior search. The electronic device 101 may perform cell reselection based on the search result.

For example, the first cell on which the electronic device 101 currently camps may not support the dual connectivity. In this case, the electronic device 101 may not support the dual connectivity, so the electronic device 101 may not support a second network communication (e.g., an NR communication). In addition, even though the electronic device 101 performs cell reselection, there may be a possibility that the electronic device 101 camps on a cell which does not support the dual connectivity. According to the above-described scheme, a probability that the electronic device 101 will camp on a cell supporting the dual connectivity may be increased, and a probability that the electronic device 101 will be RRC connected to the corresponding cell later may also be increased. Accordingly, a possibility that the dual connectivity fails may be decreased.

In various embodiments, the electronic device 101 may be configured to perform an operation of FIG. 5 if the currently camped-on first cell does not support the dual connectivity, but there is no limitation. In various embodiments, the electronic device 101 may identify whether the first cell supports the dual connectivity, for example, based on upper-layerindication-r15 in the SIB2.

Figure 7:
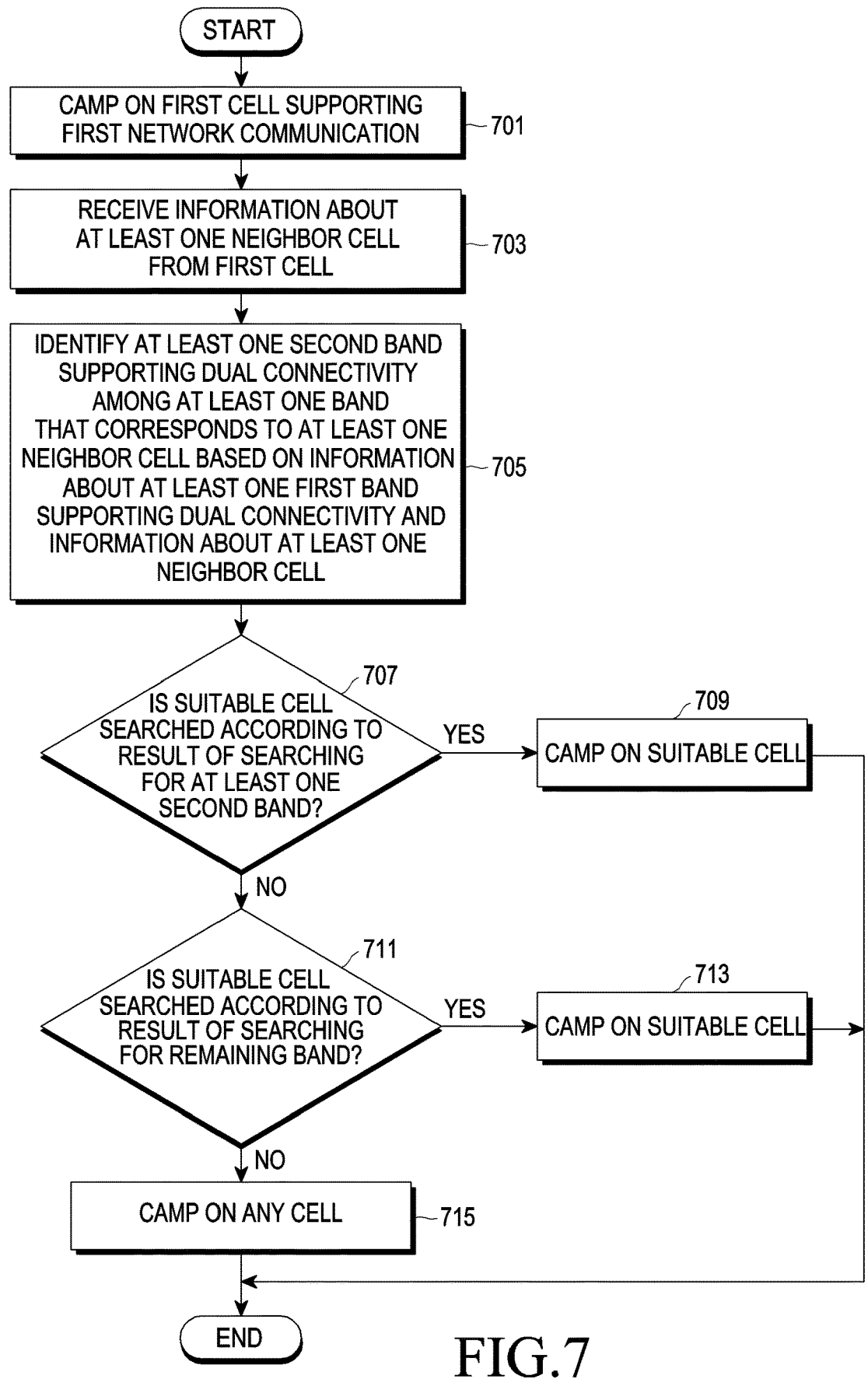
FIG. 7 illustrates a flowchart for describing an operating method of an electronic device according to various embodiments.
Figure 8:
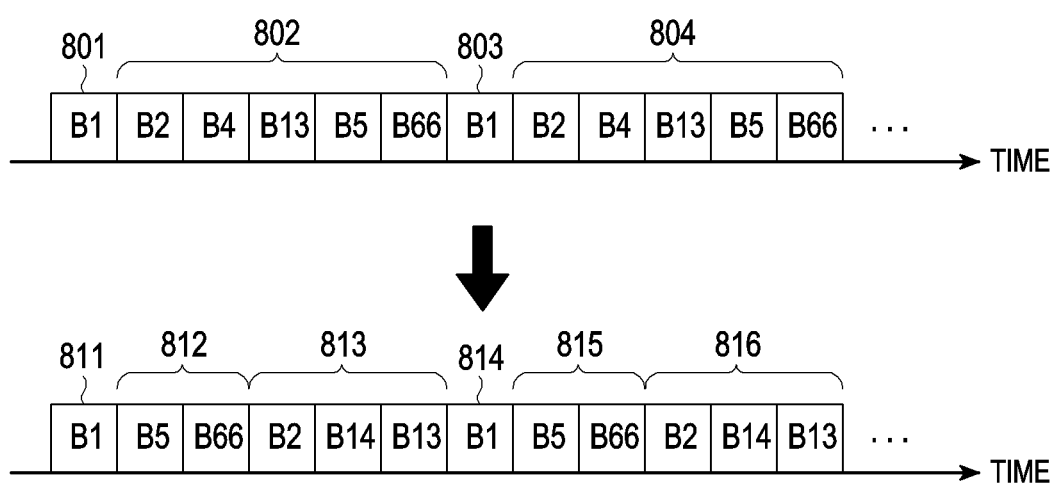
FIG. 8 illustrates a diagram for describing a search operation of an electronic device according to various embodiments.

FIG. 7 illustrates a flowchart for describing an operating method of an electronic device according to various embodiments. An embodiment of FIG. 7 will be described with reference to FIG. 8. FIG. 8 illustrates a diagram for describing a search operation of an electronic device according to various embodiments. Operations which have been previously described among operations in FIG. 7 will be briefly described.

According to various embodiments, an electronic device 101 (e.g., at least one of a first communication processor 212, a second communication processor 214, or an integrated communication processor 260) may camp on a first cell which supports a first network communication in operation 701. In operation 703, the electronic device 101 may receive information about at least one neighbor cell from the first cell. In operation 705, the electronic device 101 may identify at least one second band which supports dual connectivity among at least one band which corresponds to the at least one neighbor cell based on information about at least one first band which supports the dual connectivity and the information about the at least one neighbor cell and.

For example, referring to FIG. 8, the electronic device 101 may camp on a serving cell of a B1 band. The electronic device 101 may receive information about a band which corresponds to a neighbor cell from a first cell which is the serving cell. As described above, the information about the band corresponding to the neighbor cell may be expressed in a frequency, not a band identifier. The electronic device 101 may identify that band supporting the dual connectivity among the bands which correspond to the neighbor cell includes B5 and B66 bands. The electronic device 101 may identify that a band which does not support the dual connectivity includes B1, B2, B4, and B13 bands.

A graph on the lower side in FIG. 8 is a graph for a search order in a case that the electronic device 101 performs a prior search, and a graph on the upper side in FIG. 8 is a graph for a search order in a case that the electronic device 101 does not perform the prior search. If the prior search is not performed, as shown in the upper side in FIG. 8, the electronic device 101 may perform a search 801 for a band (e.g., the B1 band) which corresponds to the serving cell, and perform a search 802 for a band which corresponds to the neighbor cell (e.g., the B2, B4, B5, B13, and B66 bands). There is no limitation to a search order for the band corresponding to the neighbor cell (e.g., the B2, B4, B5, B13, and B66 bands). The electronic device 101 may perform a search 803 for the band (e.g., the B1 band) which corresponds to the serving cell, and perform a search 804 for the band which corresponds to the neighbor cell (e.g., the B2, B4, B5, B13, and B66 bands.

According to various embodiments, upon performing the prior search, as shown in the lower side in FIG. 8, the electronic device 101 may preferentially perform a search for the B5 and B66 bands supporting the dual connectivity compared to other bands. For example, the electronic device 101 may perform a search 811 for the band (e.g., the B1 band) which corresponds to the serving cell, perform a search 812 for the band (e.g., the B5 and B66 bands) which supports the dual connectivity, and perform a search 813 for the band (e.g., the B2, B4, and B66 bands) which does not support the dual connectivity. The electronic device 101 may perform a search 814 for the band (e.g., the B1 band) which corresponds to the serving cell, perform a search 815 for the band (e.g., the B5 and B66 bands) which supports the dual connectivity, and perform a search 816 for the band (e.g., the B2, B4, and B66 bands) which does not support the dual connectivity. In various embodiments, the electronic device 101 may not perform the search 816 for the band (e.g., the B2, B4, and B13 bands) which does not support the dual connectivity. In this case, the electronic device 101 may perform repeatedly a search for the band (e.g., the B5 and B66 bands) which supports the dual connectivity until a time point at which the electronic device 101 performs repeatedly a search for the band (e.g., the B1 band) which corresponds to the serving cell. In various embodiments, the electronic device 101 may perform a search for the band which supports the dual connectivity before searching for the serving cell.

Referring back to FIG. 7, the electronic device 101 may identify whether a suitable cell is searched according to a result of searching for the at least one second band in operation 707. If it is identified that at least one suitable cell is searched (707-YES), the electronic device 101 may camp on a suitable cell in operation 709. According to various embodiments, if at least two suitable cells are searched, one of the at least two suitable cells may be selected based on a measurement value of the at least one suitable cell. The measurement value of the suitable cell may include information (e.g., received signal received power (RSRP) or a received signal strength indication (RSSI)) related to strength of a signal (e.g., at least one of a reference signal, an LTE CRS, an SSS included in an NR SS/PBCH block, a DMRS of a PBCH included in the NR SS/PBCH block, an LTE CSI-RS, or an NR CSI-RS) transmitted from the suitable cell. If the suitable cell is not searched (707-NO), the electronic device 101 may identify whether the suitable cell is searched according to a result of searching for a remaining band in operation 711. If the suitable cell is searched in the remaining band (711-YES), the electronic device 101 may camp on the suitable cell in operation 713. According to various embodiments, if at least two suitable cells are searched, one of the at least two suitable cells may be selected based on a measurement value of the at least one suitable cell. The measurement value of the suitable cell may include information (e.g., RSRP or an RSSI) related to strength of a signal (e.g., at least one of a reference signal, an LTE CRS, an SSS included in an NR SS/PBCH block, a DMRS of a PBCH included in the NR SS/PBCH block, an LTE CSI-RS, or an NR CSI-RS) transmitted from the suitable cell. If the suitable cell is not searched in the remaining band (711-NO), the electronic device 101 may camp on any cell in operation 715. For example, in FIG. 8, if the suitable cell is searched according to a search result for the B5 and B66 bands, the electronic device 101 may camp on the suitable cell. If the suitable cell is not searched according to the search result for the B5 and B66 bands, the electronic device 101 may camp on a suitable cell of the B2, B4, and B13 bands. In various embodiments, if the suitable cell is not searched according to the search result for the B5 and B66 bands, the electronic device 101 may camp on any cell among cells supporting the B5 and B66 bands.

Figure 9:
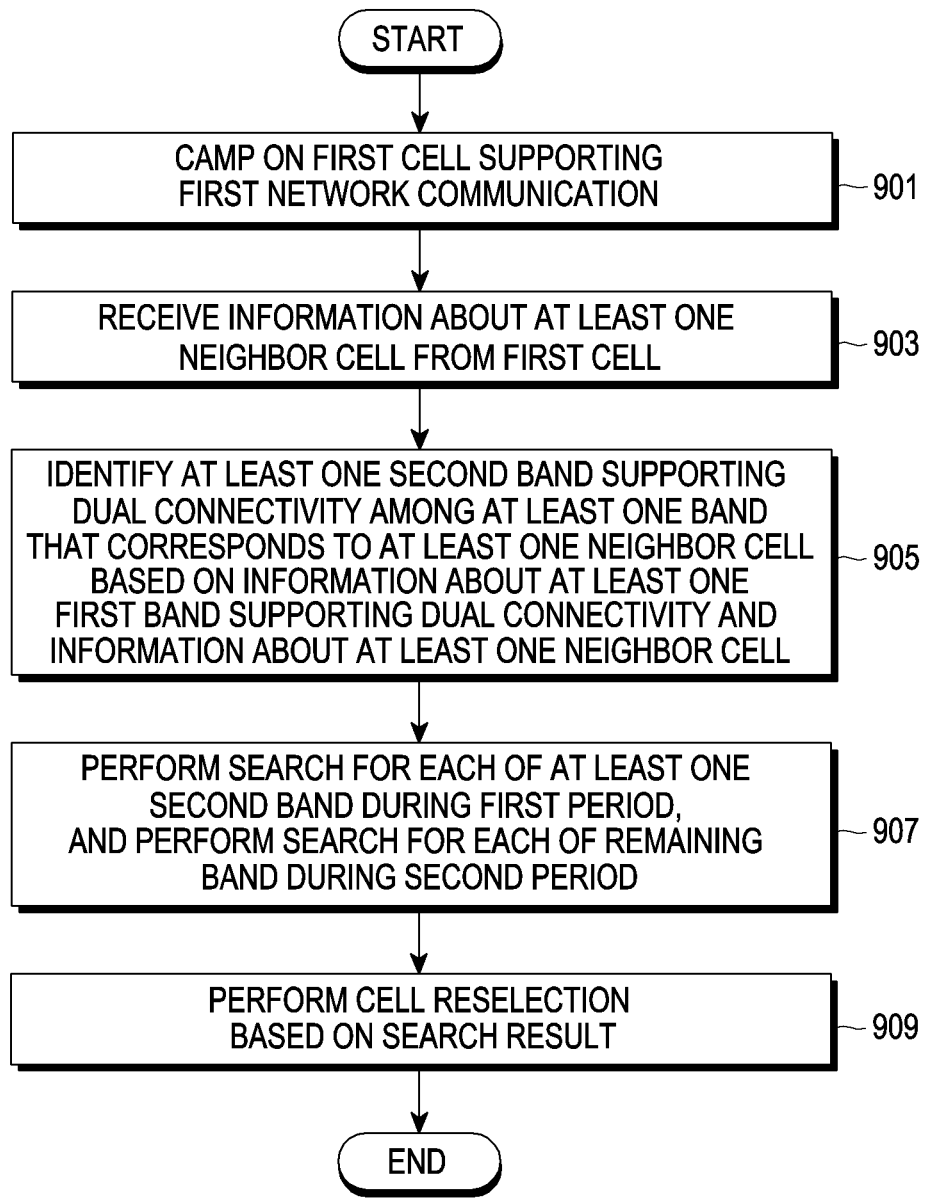
FIG. 9 illustrates a flowchart for describing an operating method of an electronic device according to various embodiments.
Figure 10:
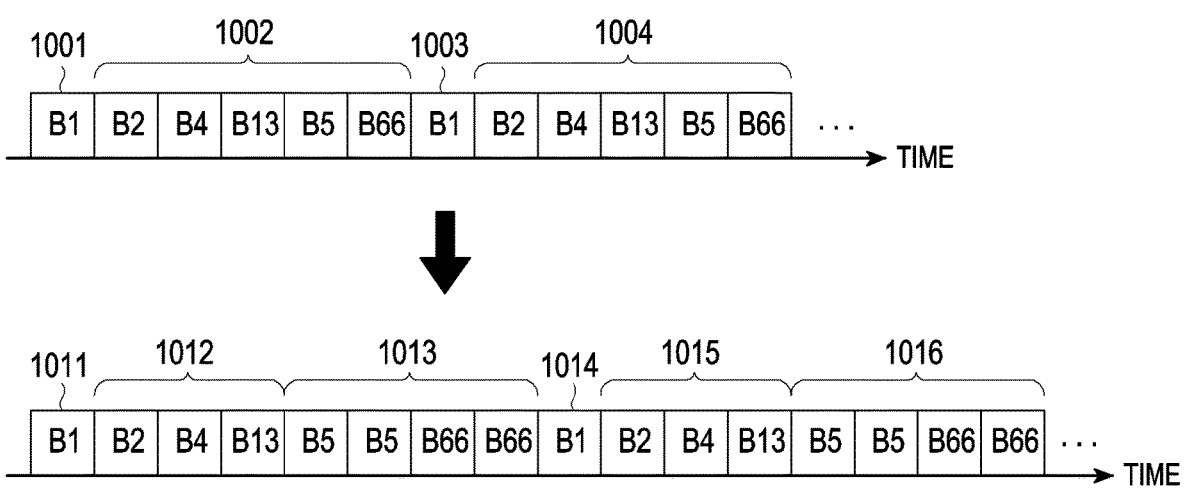
FIG. 10 illustrates a diagram for describing a search operation of an electronic device according to various embodiments.

FIG. 9 illustrates a flowchart for describing an operating method of an electronic device according to various embodiments. An embodiment of FIG. 9 will be described with reference to FIG. 10. FIG. 10 illustrates a diagram for describing a search operation of an electronic device according to various embodiments. Operations which have been previously described among operations in FIG. 9 will be briefly described.

According to various embodiments, an electronic device 101 (e.g., at least one of a first communication processor 212, a second communication processor 214, or an integrated communication processor 260) may camp on a first cell which supports a first network communication in operation 901. In operation 903, the electronic device 101 may receive information about at least one neighbor cell from the first cell. In operation 905, the electronic device 101 may identify at least one second band which supports dual connectivity among at least one band which corresponds to the at least one neighbor cell based on the information about the at least one neighbor cell and information about at least one first band which supports the dual connectivity. In operation 907, the electronic device 101 may perform a search for each of the at least one second band during a first period, and perform a search for each remaining band during a second period. According to various embodiments, if at least two suitable cells are searched, one of the at least two suitable cells may be selected based on a measurement value of a suitable cell. The measurement value of the suitable cell may include information (e.g., RSRP or an RSSI) related to strength of a signal transmitted from the suitable cell (e.g., at least one of a reference signal, an LTE CRS, an SSS included in an NR SS/PBCH block, a DMRS of a PBCH included in the NR SS/PBCH block, an LTE CSI-RS, or an NR CSI-RS). For example, referring to FIG. 10, the electronic device 101 may camp on a serving cell of a B1 band. The electronic device 101 may receive information about a band (e.g., B2, B4, B5, B13, and B66 bands) which corresponds to a neighbor cell from a first cell as the serving cell. As described above, the information about the band corresponding to the neighbor cell may be expressed in a frequency, not a band identifier. The electronic device 101 may identify that a band supporting the dual connectivity among the bands corresponding to the neighbor cell includes B5 and B66 bands. The electronic device 101 may identify that a band which does not support the dual connectivity includes B1, B2, B4, and B13 bands.

A graph on the lower side in FIG. 10 is a graph for a search order in a case that the electronic device 101 performs a prior search, and a graph on the upper side in FIG. 10 is a graph for a search order in a case that the electronic device 101 does not perform the prior search. If the prior search is not performed, the electronic device 101 may perform a search 1001 for a band (e.g., the B1 band) which corresponds to the serving cell, and perform a search 1002 for a band which corresponds to the neighbor cell (e.g., the B2, B4, B5, B13, and B66 bands). There is no limitation to a search order for the band corresponding to the neighbor cell (e.g., the B2, B4, B5, B13, and B66 bands). The electronic device 101 may perform a search 1003 for the band (e.g., the B1 band) which corresponds to the serving cell, and perform a search 1004 for the band which corresponds to the neighbor cell (e.g., the B2, B4, B5, B13, and B66 bands). Upon performing the prior search, the electronic device 101 may perform a search for the B5 and B66 bands supporting the dual connectivity during a search period longer than other bands. For example, as shown in the lower side in FIG. 10, the electronic device 101 may perform a search 1011 for a band (e.g., the B1 band) which corresponds to the serving cell, and perform a search 1012 for a band which does not support the dual connectivity (e.g., the B2, B4, and B13 bands). The electronic device 101 may search for each band (e.g., the B2, B4, and B13 bands) which does not support the dual connectivity during a first period. The electronic device 101 may perform a search 1013 for a band (e.g., the B5 and B66 bands) supporting the dual connectivity. The electronic device 101 may perform a search for each band supporting the dual connectivity (e.g., the B5 and B66 bands) during a second period, and the second period may be longer than the first period. The electronic device 101 may perform a search 1014 for the band (e.g., the B1 band) which corresponds to the serving cell, perform a search 1015 for the band (e.g., the B2, B4, and B13 bands) which does not support the dual connectivity, and perform a search 1016 for the band (e.g., the B5 and B66 bands) supporting the dual connectivity. In various embodiments, the electronic device 101 may not perform the search 1012 for the band (e.g., the B2, B4, and B13 bands) which does not support the dual connectivity. In operation 909, the electronic device 101 may perform cell reselection based on the search result.

In various embodiments, as shown in FIG. 8, the electronic device 101 may preferentially perform a search for the band supporting the dual connectivity compared to the band which does not support the dual connectivity, and at the same time, the electronic device 101 may perform the search for the band supporting the dual connectivity during a longer period compared to the band which does not support the dual connectivity.

Figure 11:
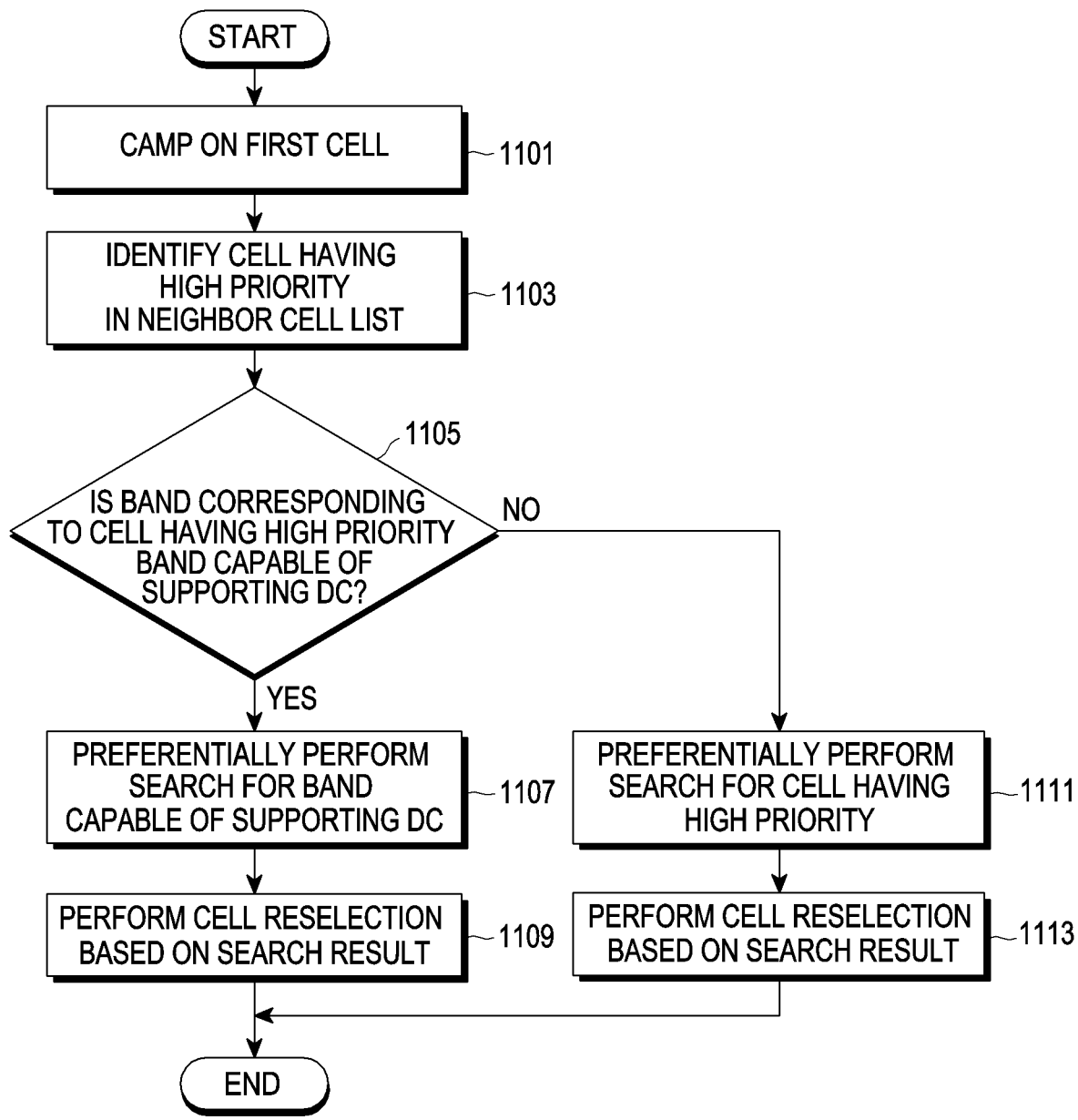
FIG. 11 illustrates a flowchart for describing an operating method of an electronic device according to various embodiments.
Figure 12:
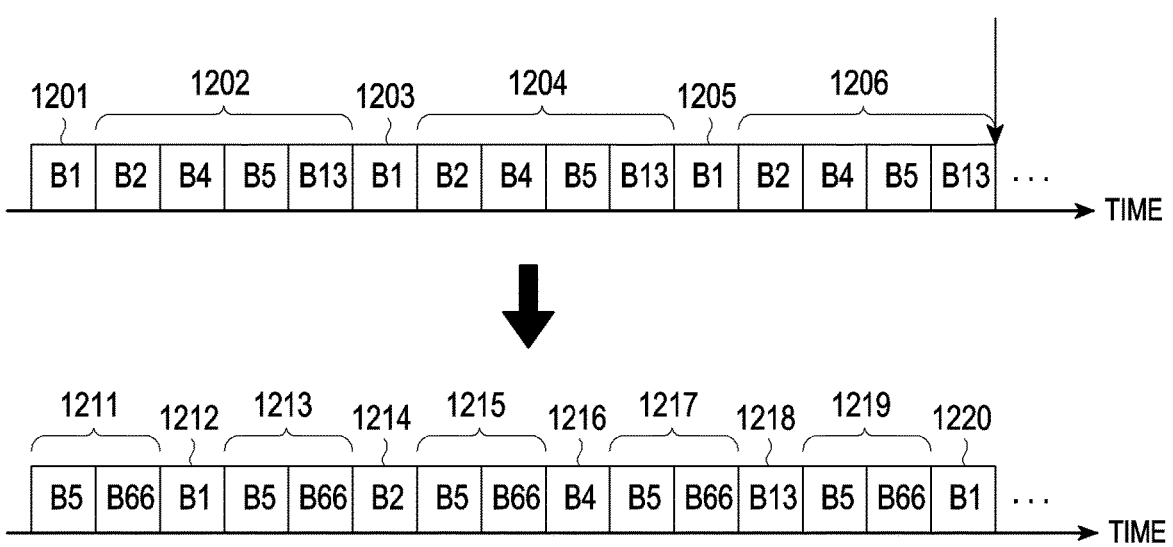
FIG. 12 illustrates a diagram for describing a search operation of an electronic device according to various embodiments.

FIG. 11 illustrates a flowchart for describing an operating method of an electronic device according to various embodiments. An embodiment of FIG. 11 will be described with reference to FIG. 12. FIG. 12 illustrates a diagram for describing a search operation of an electronic device according to various embodiments. Operations which have been previously described among operations in FIG. 11 will be briefly described.

According to various embodiments, an electronic device 101 (e.g., at least one of a first communication processor 212, a second communication processor 214, or an integrated communication processor 260) may camp on a first cell which supports a first network communication in operation 1101. In operation 1103, the electronic device 101 may identify a cell having a higher priority than a priority of a serving cell in a neighbor cell list. For example, the electronic device 101 may receive an SIB5 and/or SIB6 from the first cell, and the SIB5 and/or SIB6 may include a priority for cell reselection (cellReselectionPriority). As described above, even though an explicit neighbor cell list as physical layer cell identities is not provided, when carrier frequency information is received from the serving cell, the electronic device 101 may identify a new inter-frequency cell, and perform RSRP and/or RSRQ measurement. In this case, the electronic device 101 may receive information about a priority of an inter-frequency layer. In the present disclosure, a priority for cell reselection may mean a priority of an inter-frequency layer and/or a priority of a neighbor cell. The priority of the inter-frequency layer may mean, for example, inter-frequency carrier frequencies, and this may be expressed by a priority of a band in the present disclosure.

According to various embodiments, if a first measurement value (e.g., Srxlev) for the serving cell is greater than a first threshold value (SnonIntraSearchP), and a second measurement value (e.g., Squal) for the serving cell is greater than a second threshold value (SnonIntraSearchQ), the electronic device 101 may measure RSRP and/or RSRQ for inter-frequency layers of a high priority, but there is no limitation to a criterion for initiating measurement. If the first measurement value (e.g., the Srxlev) for the serving cell is less than or equal to the first threshold value (SnonIntraSearchP), and the second measurement value (e.g., the Squal) for the serving cell is less than or equal to the second threshold value (SnonIntraSearchQ), the electronic device 101 may perform measurement for all of a high priority, the same priority, and a low priority, and this will be described later.

According to various embodiments, the electronic device 101 may identify whether a band corresponding to a cell having a high priority is a band capable of supporting dual connectivity in operation 1105. According to various embodiments, the electronic device 101 may identify whether the band corresponding to the cell having the high priority is a band in which an MN cell for the dual connectivity is operable in operation 1105. As described above, the electronic device 101 may store information about a band capable of supporting the dual connectivity, and may identify whether the band corresponding to the cell having the high priority supports the dual connectivity based on the stored information. If it is identified that the dual connectivity is supported in a band having the high priority (1105-YES), the electronic device 101 may preferentially perform a search for the band capable of supporting the dual connectivity in operation 1107. In operation 1109, the electronic device 101 may perform cell reselection based on the search result. If it is identified that there is no band capable of supporting the dual connectivity in the band having the high priority (1105-NO), the electronic device 101 may preferentially perform a search for the cell having the high priority in operation 1111. For example, the electronic device 101 may perform a search for the cell having the high priority during a specified period (e.g., Thigher_priority_search). In operation 1113, the electronic device 101 may perform cell reselection based on the search result.

For example, referring to FIG. 12, the electronic device 101 may camp on a serving cell of a B1 band. The electronic device 101 may receive information about a band (e.g., B2, B4, B5, B13, and B66 bands) which corresponds to a neighbor cell from a first cell as the serving cell. As described above, the information about the band corresponding to the neighbor cell may be expressed in a frequency, not a band identifier. The electronic device 101 may identify that a band supporting dual connectivity among the bands which correspond to the neighbor cell includes B5 and B66 bands. The electronic device 101 may identify that a band which does not support the dual connectivity includes B1, B2, B4, and B13 bands. In addition, the electronic device 101 may identify that a band having a high priority includes the B2, B4, B5, and B13 bands, and a band having the same priority is the B66 band.

A graph on the lower side in FIG. 12 is a graph for a search order in a case that the electronic device 101 performs a prior search, and a graph on the upper side in FIG. 12 is a graph for a search order in a case that the electronic device 101 does not perform the prior search. According to a comparative example, the electronic device 101 which does not support a prior search function may perform a search (1201, 1203, and 1205) for a band (e.g., a B1 band) which corresponds to a serving cell, and perform a search (1202, 1204, and 1206) for a band (e.g., B2, B4, B5, and B13 bands) having a high priority. The electronic device 101 according to the comparative example may perform a search for the band (e.g., the B1 band) which corresponds to the serving cell and the band (e.g., the B2, B4, B5, and B13 bands) having the high priority at least until a specified period (e.g., Thigher_priority_search) expires. For example, if an eDRX_IDLE cycle is set for the electronic device 101 according to the comparative example, the specified period (e.g., the Thigher_priority_search) may be a value obtained by multiplying the number of carrier frequency layers having a high priority by specified time (e.g., 60 seconds). If the eDRX_IDLE cycle is set for the electronic device 101 according to the comparative example, the specified period (e.g., the Thigher_priority_search) may be a large value between one eDRX_IDLE cycle and the value obtained by multiplying the number of carrier frequency layers having the high priority by the specified time (e.g., 60 seconds). For the specified period (e.g., the Thigher_priority_search), 3GPP TS 36.133 may be referred to.

Upon performing a prior search (e.g., 1105-YES in FIG. 11), the electronic device 101 according to various embodiments may perform a search 1211 for the band (e.g., the B5 and B66 bands) supporting the dual connectivity as shown in the lower side in FIG. 12. Then, the electronic device 101 may perform a search 1212 for the band (e.g., the B1 band) which corresponds to the serving cell. The electronic device 101 may perform a search (1211, 1213, 1215, 1217, and 1219) for the band (e.g., the B5 and B66 bands) supporting the dual connectivity, a search (1220) for the band (e.g., the B1 band) which corresponds to the serving cell, and a search (1214, 1216, and 1218) for the band (e.g., the B2, B4, and B13 bands) which does not support the dual connectivity until the specified period (e.g., the Thigher_priority_search) expires. As illustrated in FIG. 12, the band supporting the dual connectivity (e.g., the B5 and B66 bands) may be searched with a higher frequency than the band which does not support the dual connectivity (e.g., the B2, B4, and B13 bands). In various embodiments, the electronic device 101 may perform a search for a band having the same priority, in the same manner as the band having the high priority. If the same priority is set not to be searched in the same manner as the high priority, the electronic device 101 may perform a prior search only for the B5 band as shown in the lower side in FIG. 12.

In various embodiments, the electronic device 101 may preferentially search for a frequency supporting the dual connectivity if the frequency supporting the dual connectivity coexists with a frequency which does not support the dual connectivity within a frequency having a high priority. In various embodiments, the electronic device 101 may perform a search for the frequency supporting the dual connectivity with a higher frequency and/or during a longer period, compared to a case in which a prior search is not performed. According to performance of the prior search, the electronic device 101 may be prevented from being camped on a cell which does not support the dual connectivity before the specified period (e.g., the Thigher_priority_search) expires.

Figure 13:
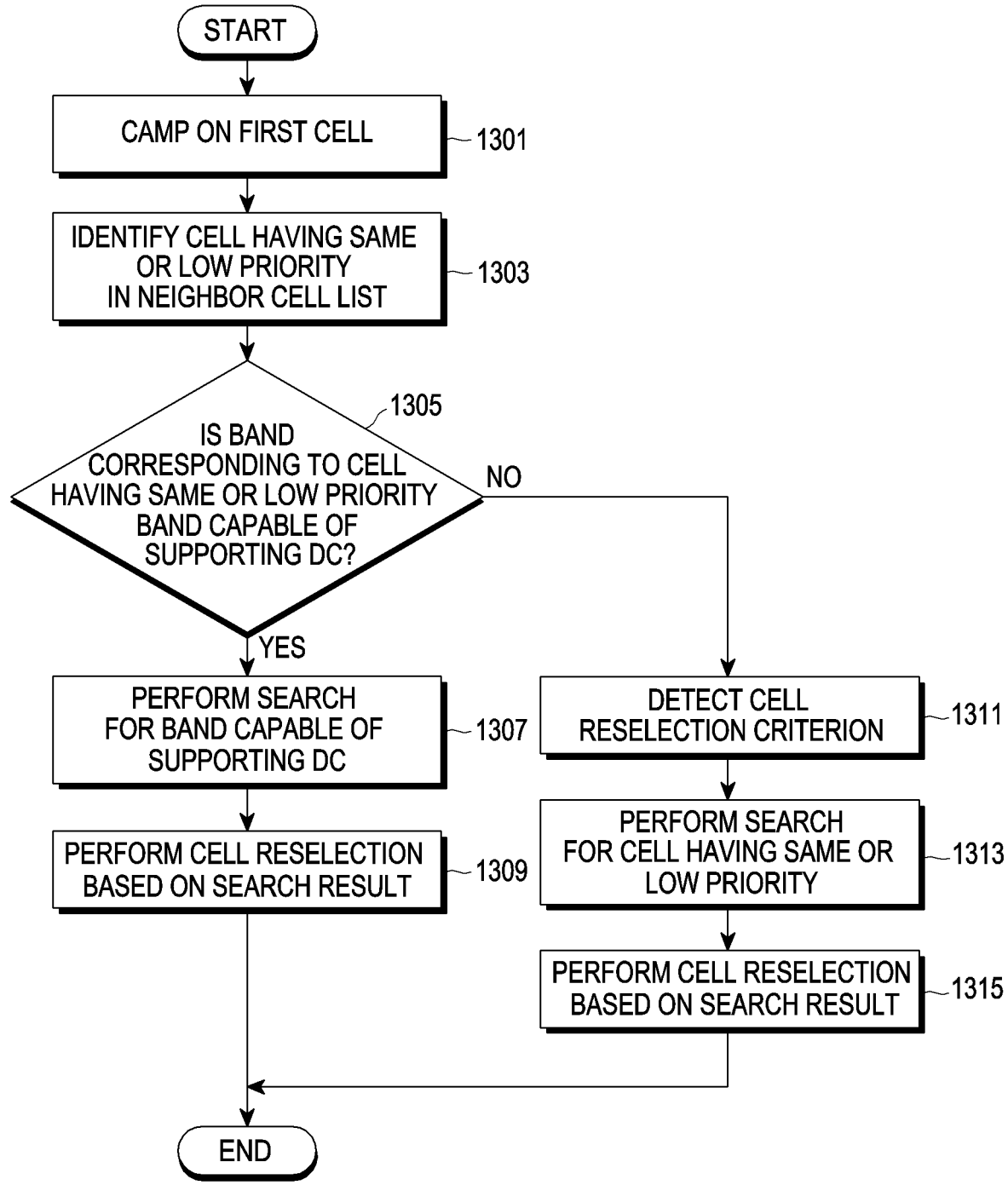
FIG. 13 illustrates a flowchart for describing an operating method of an electronic device according to various embodiments.
Figure 14:
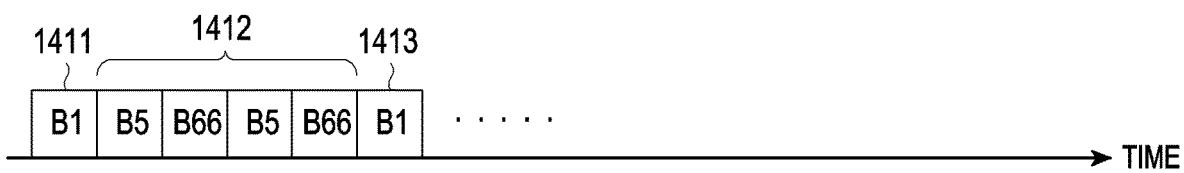
FIG. 14 illustrates a diagram for describing a search operation of an electronic device according to various embodiments.

FIG. 13 illustrates a flowchart for describing an operating method of an electronic device according to various embodiments. An embodiment of FIG. 13 will be described with reference to FIG. 14. FIG. 14 illustrates a diagram for describing a search operation of an electronic device according to various embodiments. Operations which have been previously described among operations in FIG. 13 will be briefly described.

According to various embodiments, an electronic device 101 (e.g., at least one of a first communication processor 212, a second communication processor 214, or an integrated communication processor 260) may camp on a first cell which supports a first network communication in operation 1301. In operation 1303, the electronic device 101 may identify a cell (or a frequency) having a priority lower than or equal to a priority of the serving cell in a neighbor cell list. For example, in the neighbor cell list, priorities of all cells supporting the dual connectivity may be equal to or lower than the priority of the serving cell. In operation 1305, the electronic device 101 may identify whether a band (or a frequency) corresponding to a cell having the same or low priority is a band capable of supporting the dual connectivity. If it is identified that the band (or the frequency) corresponding to the cell having the same or low priority is the band capable of supporting the dual connectivity (1305-YES), the electronic device 101 may perform a search for the band capable of supporting the dual connectivity in operation 1307. In operation 1309, the electronic device 101 may perform cell reselection based on the search result.

For example, referring to FIG. 14, the electronic device 101 may camp on a serving cell of a B1 band. The electronic device 101 may receive information about a band (e.g., B2, B4, B5, B13, and B66 bands) which corresponds to a neighbor cell from a first cell as the serving cell. As described above, the information about the band corresponding to the neighbor cell may be expressed in a frequency, not a band identifier. The electronic device 101 may identify that a band supporting the dual connectivity among the bands corresponding to the neighbor cell includes B5 and B66 bands. The electronic device 101 may identify that a band which does not support the dual connectivity includes B1, B2, B4, and B13 bands. In addition, the electronic device 101 may identify that a band having a low priority includes B2, B4, B5, and B66 bands.

A graph in FIG. 14 is a graph for a search order if the electronic device 101 performs a prior search. Upon performing the prior search (e.g., 1305-YES in FIG. 13), the electronic device 101 may perform a search for a band having the same priority and/or a low priority even though a cell reselection criterion is not detected. For example, as shown in FIG. 14, if a first measurement value (e.g., Srxlev) for a serving cell is greater than a first threshold value (SnonIntraSearchP), and a second measurement value (e.g., Squal) is greater than a second threshold value (SnonIntraSearchQ) for the serving cell, the electronic device 101 may also perform measurement for the same priority and the low priority. The electronic device 101 may perform repeatedly measurement (1411 and 1413) for a band (e.g., a B1 band) which corresponds to the serving cell and measurement (1412) for a band (e.g., B5 and B66 bands) which corresponds to the low priority.

Referring back to FIG. 13, if it is identified that the band (or the frequency) corresponding to the cell having the same or low priority is not the band capable of supporting the dual connectivity (1305-NO), the electronic device 101 may detect a cell reselection criterion in operation 1311. For example, if it is detected that the first measurement value (e.g., the Srxlev) for the serving cell is equal to or less than the first threshold (SnonIntraSearchP), or the second measurement value (e.g., the Squal) for the serving cell is equal to or less than the second threshold value (SnonIntraSearchQ), the electronic device 101 may identify that the cell reselection criterion is detected. If the cell reselection criterion is detected, the electronic device 101 may perform a search for a cell having the same or low priority in operation 1313. In operation 1315, the electronic device 101 may perform cell reselection based on the search result. If the cell reselection criterion is not detected, the electronic device 101 may not perform a search. The electronic device 101 may perform a search for a frequency having a low priority which does not support the dual connectivity if the cell reselection criterion (Srxlev≤SnonIntraSearchP or Squal≤SnonIntraSearchQ) is satisfied as defined in 3GPP TS 36.133. The electronic device 101 may perform a search for a frequency having a low priority which supports the dual connectivity while ignoring whether the cell reselection criterion is satisfied. According to various embodiments, if a cell is not detected for specified time and/or a specified number of times, the electronic device 101 may stop the above-described operation during a determined period, and then resume the above-described search operation again.

Figure 15:
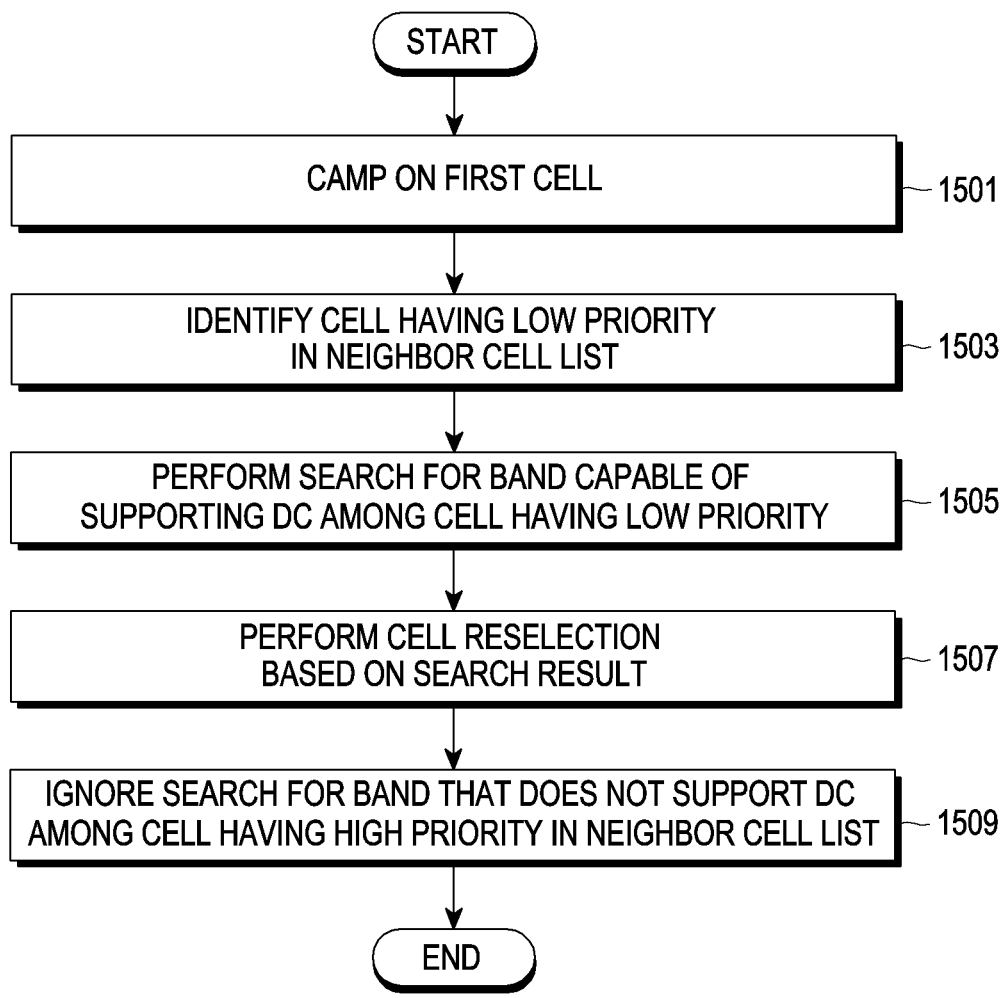
FIG. 15 illustrates a flowchart for describing an operating method of an electronic device according to various embodiments.

FIG. 15 illustrates a flowchart for describing an operating method of an electronic device according to various embodiments. Operations which have been previously described among operations in FIG. 15 will be briefly described.

According to various embodiments, an electronic device 101 (e.g., at least one of a first communication processor 212, a second communication processor 214, or an integrated communication processor 260) may camp on a first cell which supports a first network communication in operation 1501. In operation 1503, the electronic device 101 may identify a cell having a low priority in a neighbor cell list. In operation 1505, the electronic device 101 may search for a band capable of supporting dual connectivity among the cells having the low priority. In operation 1507, the electronic device 101 may perform cell reselection based on the search result. In operation 1509, the electronic device 101 may ignore a search for a band which does not support the dual connectivity among cells having a high priority in the neighbor cell list. If cell reselection for a cell which has the high priority and does not support the dual connectivity is performed, a probability that a ping-pong phenomenon in which a cell supporting the dual connectivity and having the low priority is reselected may be high. Accordingly, if a cell having the low priority is reselected, the electronic device 101 may ignore (or not perform or skip) a search for a cell which does not support the dual connectivity among cells having the high priority. In various embodiments, if a cell having the same priority is reselected, the electronic device 101 may ignore a search for a cell which does not support the dual connectivity as described above, or perform unrestricted cell reselection.

Figure 16:
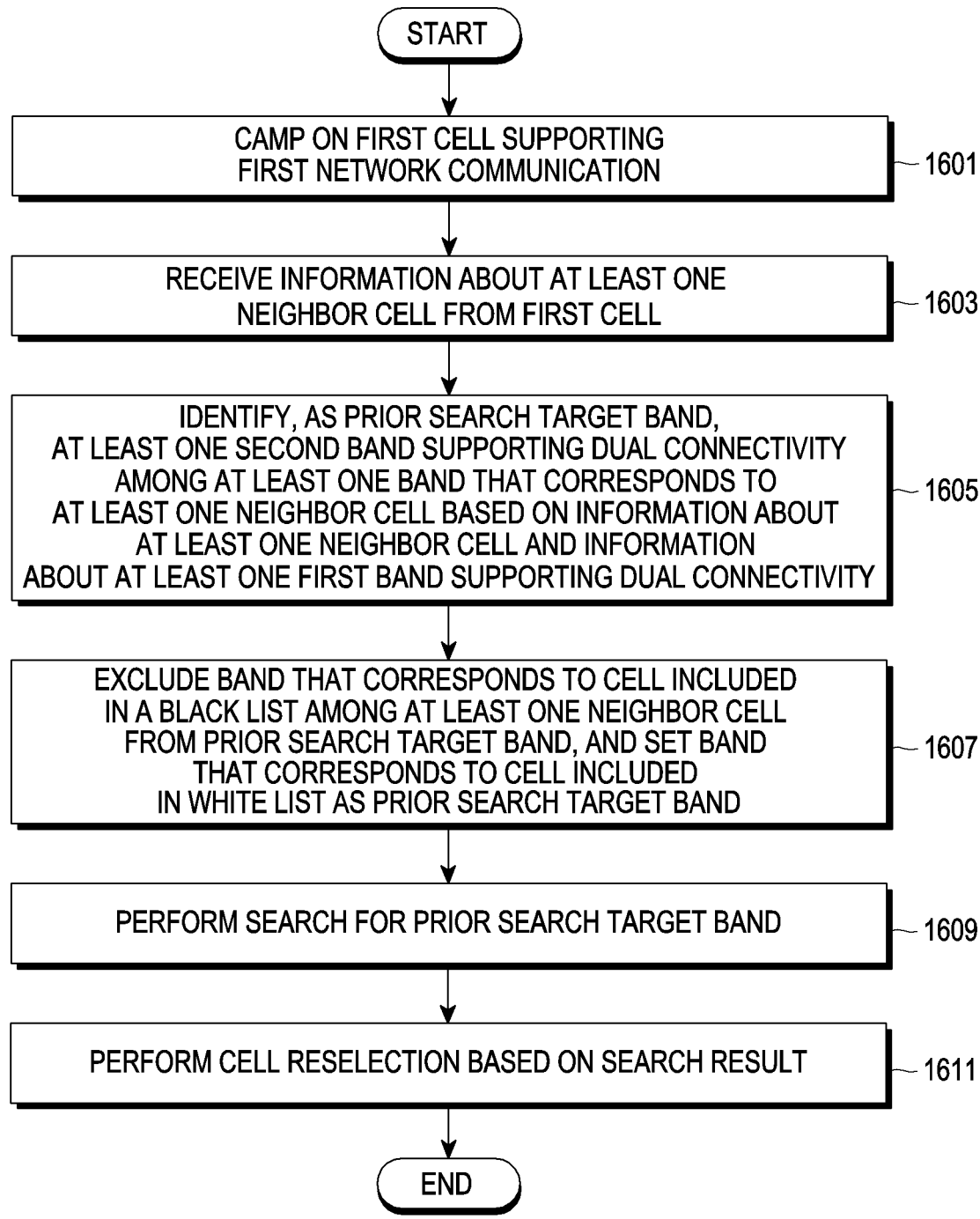
FIG. 16 illustrates a flowchart for describing an operating method of an electronic device according to various embodiments.

FIG. 16 illustrates a flowchart for describing an operating method of an electronic device according to various embodiments. Operations which have been previously described among operations in FIG. 16 will be briefly described.

According to various embodiments, an electronic device 101 (e.g., at least one of a first communication processor 212, a second communication processor 214, or an integrated communication processor 260) may camp on a first cell which supports a first network communication in operation 1601. In operation 1603, the electronic device 101 may receive information about at least one neighbor cell from the first cell. In operation 1605, the electronic device 101 may identify, as a prior search target band, at least one second band which supports dual connectivity among at least one band which corresponds to the at least one neighbor cell based on the information about the at least one neighbor cell and information about at least one first band which supports the dual connectivity. In operation 1607, the electronic device 101 may exclude a band which corresponds to a cell included in a black list among the at least one neighbor cell from the prior search target band. For example, the electronic device 101 may manage information about whether a specific cell supports the dual connectivity. The electronic device 101 may identify whether a corresponding cell supports the dual connectivity based on upperlayerindication-r15 in an SIB2, and store and manage the identified result. The electronic device 101 may manage a blacklist for a prior search target band, and may not perform a priority search for a cell included in the blacklist. For example, based on SIB2 information received from cells included in a band for which at least one search is performed, if it is identified that all cells which belong to the band do not support the dual connectivity, the band may be designated as a blacklist during arbitrary time. According to various embodiments, the arbitrary time may be arbitrarily determined by a terminal, or may be determined based on information provided by a base station. In operation 1607, the electronic device 101 may set a band which corresponds to a cell included in a white list among the at least one neighbor cell as a prior search target band. For example, the electronic device 101 may manage information about whether a specific cell supports the dual connectivity. The electronic device 101 may identify whether a corresponding cell supports the dual connectivity based on upperlayerindication-r15 in an SIB2, and store and manage the identified result. The electronic device 101 may manage a whitelist for a prior search target band, and perform a priority search for a cell included in the whitelist regardless of the blacklist. The electronic device 101 may set the prior search target band based on at least one of the blacklist or the white list. In operation 1609, the electronic device 101 may perform a search for the prior search target band. In operation 1611, the electronic device 101 may perform cell reselection based on the search result. According to various embodiments, the blacklist or the white list may be managed as a list of separate bands, respectively. According to various embodiments, the electronic device 101 may store an indicator indicating that a corresponding band is included in the blacklist and an indicator indicating that the corresponding band is included in the white list for each band. According to an embodiment, the electronic device 101 allocates 2 bits for each band, and store and manage information of which one bit of the 2 bits indicates whether each band is included in the blacklist and another bit of the 2 bits indicates whether each band is included in the white list.

Figure 17:
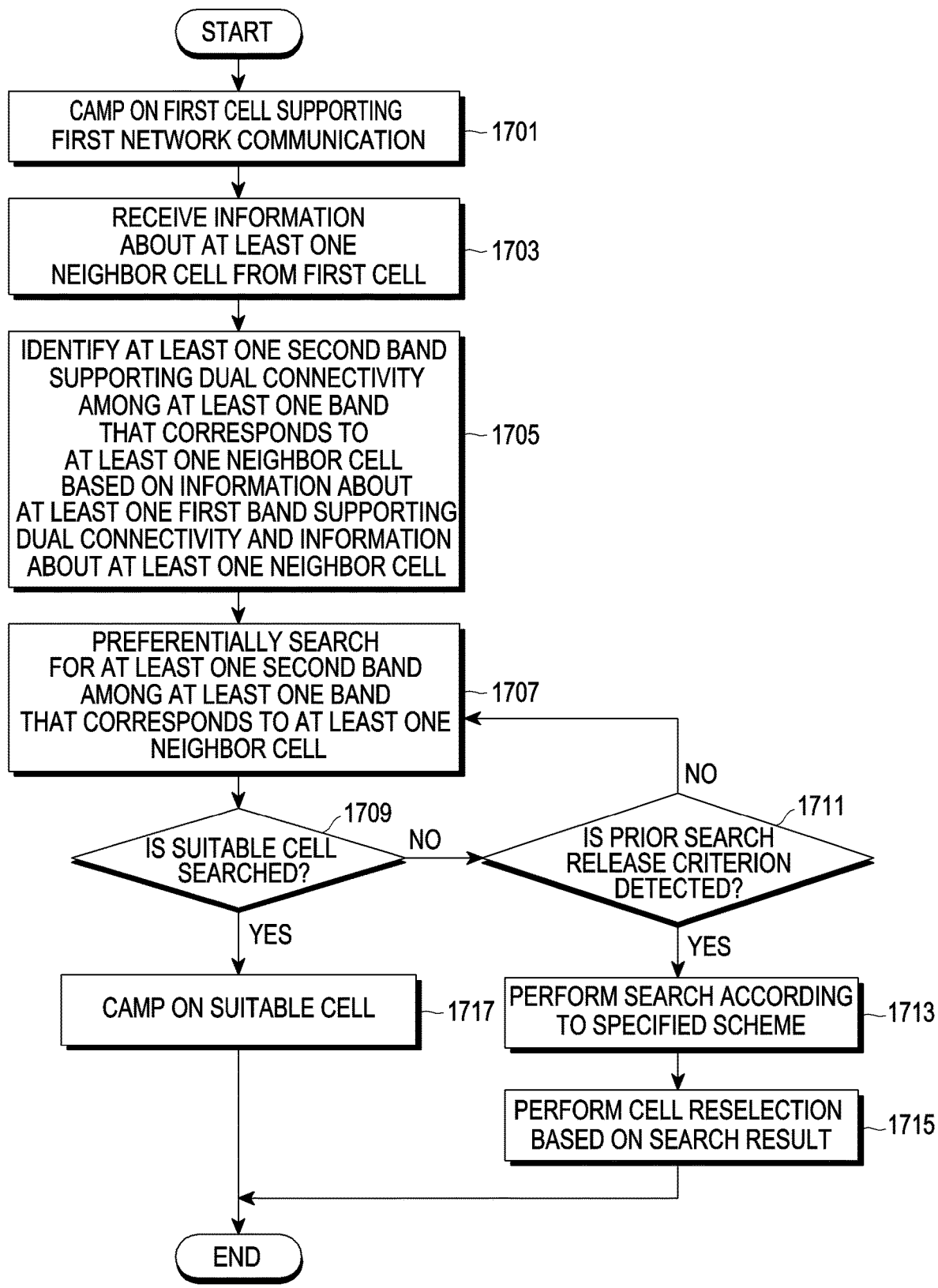
FIG. 17 illustrates a flowchart for describing an operating method of an electronic device according to various embodiments.

FIG. 17 illustrates a flowchart for describing an operating method of an electronic device according to various embodiments. Operations which have been previously described among operations in FIG. 17 will be briefly described.

According to various embodiments, an electronic device 101 (e.g., at least one of a first communication processor 212, a second communication processor 214, or an integrated communication processor 260) may camp on a first cell which supports a first network communication in operation 1701. In operation 1703, the electronic device 101 may receive information about at least one neighbor cell from the first cell. In operation 1705, the electronic device 101 may identify, as a prior search target band, at least one second band which supports dual connectivity among at least one band which corresponds to the at least one neighbor cell based on the information about the at least one neighbor cell and information about at least one first band which supports the dual connectivity. In operation 1707, the electronic device 101 may preferentially search for the at least one second band among the at least one band corresponding to the at least one neighbor cell. In operation 1709, the electronic device 101 may identify whether a suitable cell is searched based on the prior search result. If the suitable cell is not searched (1709-NO), the electronic device 101 may identify whether a prior search release criterion is detected in operation 1711. The prior search release criterion may include, for example, a case that specified time elapses and/or a case that the number of search attempts is greater than a specified number. If the prior search release criterion is not detected (1711-NO), the electronic device 101 may continue the prior search in operation 1707. If the prior search release criterion is detected (1711-YES), the electronic device 101 may stop the prior search in operation 1713 and perform a search according to a specified scheme. The search according to the specified scheme may be, for example, a search scheme following standard, and may be a search without considering the prior search. In operation 1715, the electronic device 101 may perform cell reselection based on the search result according to the specified scheme. If the suitable cell is searched based on the prior search result (1709-YES), the electronic device 101 may camp on the suitable cell in operation 1717.

According to various embodiments, an electronic device includes at least one communication processor configured to support a first network communication and a second network communication, and a memory configured to store information about at least one first band supporting dual connectivity for the first network communication and the second network communication among a plurality of bands which correspond to the first network communication, and the at least one communication processor may be configured to: camp on a first cell supporting the first network communication; receive information about at least one neighbor cell from the first cell after camping on the first cell; identify at least one second band supporting the dual connectivity among at least one band which corresponds to the at least one first band and the information about the at least one neighbor cell; preferentially search for the at least one second band among the at least one band which corresponds to the at least one neighbor cell; and perform cell reselection from the first cell to another cell based on the search result.

According to various embodiments, as at least part of the operation of identifying the at least one second band supporting the dual connectivity among the at least one band which corresponds to the at least one neighbor cell, the at least one communication processor may be configured to: identify at least one third band having a priority higher than a priority which corresponds to the first cell based on the information about the at least one neighbor cell, and identify the at least one second band supporting the dual connectivity among the at least one third band.

According to various embodiments, as at least part of the operation of preferentially searching for the at least one second band, the at least one communication processor may be configured to: preferentially search for the at least one second band during a period set corresponding to the priority higher than the priority which corresponds to the first cell.

According to various embodiments, the at least one communication processor may be further configured to: identify at least one fourth band which does not support the dual connectivity and has a priority higher than the priority which corresponds to the first cell based on the information about the at least one neighbor cell, and search for the at least one fourth band during a period set corresponding to the priority higher than the priority which corresponds to the first cell.

According to various embodiments, as at least part of the operation of identifying the at least one second band supporting the dual connectivity among the at least one band which corresponds to the at least one neighbor cell, the at least one communication processor is configured to: identify at least one fifth band having a priority lower than or equal to a priority which corresponds to the first cell based on the information about the at least one neighbor cell, and identify the at least one second band supporting the dual connectivity among the at least one fifth band.

According to various embodiments, as at least part of the operation of preferentially searching for the at least one second band, the at least one communication processor may be configured to: search for the at least one second band in a case that a cell selection RX level value (Srxlev) for the first cell is greater than a first threshold value, and a cell selection quality value (Squal) for the first cell is greater than a second threshold value.

According to various embodiments, the at least one communication processor may be further configured to: identify at least one sixth band which does not support the dual connectivity and has a priority lower than or equal to a priority which corresponds to the first cell based on the information about the at least one neighbor cell, and suspend search for the at least one sixth band in a case that a cell selection RX level value (Srxlev) for the first cell is greater than a first threshold value, and a cell selection quality value (Squal) for the first cell is greater than a second threshold value.

According to various embodiments, as at least part of the operation of receiving the information about the at least one neighbor cell, the at least one communication processor may be configured to: receive the information about the at least one neighbor cell including at least one of the at least one band which corresponds to each of the at least one neighbor cell, or inter-frequency carrier frequency which corresponds to the first cell.

According to various embodiments, as at least part of the operation of identifying the at least one second band, the at least one communication processor may be configured to: identify the at least one second band based on a compared result between the at least one first band stored in the memory and at least one of the at least one band which corresponds to each of the at least one neighbor cell, or the inter-frequency carrier frequency which corresponds to the first cell.

According to various embodiments, as at least part of the operation of preferentially searching for the at least one second band, the at least one communication processor may be configured to: perform at least one of an operation of first searching for the at least one second band compared to at least one remaining band, an operation of searching for the at least one second band during a period longer than the at least one remaining band, or an operation of searching for the at least one second band with a frequency higher than the at least one remaining band.

According to various embodiments, as at least part of the operation of performing the cell reselection from the first cell to the other cell based on the search result, the at least one communication processor may be configured to: when a first suitable cell is searched based on the search result for the at least one second band, camp on the first suitable cell.

According to various embodiments, as at least part of the operation of performing the cell reselection from the first cell to the other cell based on the search result, the at least one communication processor may be configured to: based on a fact that a suitable cell is not searched according to the search result for the at least one second band, perform a search for a remaining band except for the at least one second band, and when a second suitable cell is searched according to the search result for the remaining band, camp on the second suitable cell.

According to various embodiments, the memory may be configured to store information about a cell which does not support the dual connectivity, and, as at least part of the operation of preferentially searching for the at least one second band, the at least one communication processor may be configured to: perform a search except for a band corresponding to the cell which does not support the dual connectivity among the at least one second band.

According to various embodiments, as at least part of the operation of preferentially searching for the at least one second band, the at least one communication processor may be configured to: identify whether a prior search release criterion is detected; and preferentially search for the at least one second band before the prior search release criterion is detected.

According to various embodiments, the at least one communication processor may be configured to perform a search for the at least one band which corresponds to the at least one neighbor cell based on a fact that the prior search release criterion is detected.

According to various embodiments, an electronic device includes at least one communication processor configured to support a first network communication and a second network communication; and a memory configured to store information about at least one first band supporting dual connectivity for the first network communication and the second network communication among a plurality of bands which correspond to the first network communication, and the at least one communication processor may be configured to: camp on a first cell supporting the first network communication; receive information about at least one neighbor cell from the first cell after camping on the first cell; identify at least one band which has a priority higher than a priority of the first cell and corresponds to the at least one neighbor cell; identify at least one second band supporting the dual connectivity among at the least one band based on the information about the at least one first band; preferentially search for the at least one second band among the at least one band which corresponds to the at least one neighbor cell; and perform cell reselection from the first cell to another cell based on the search result.

According to various embodiments, as at least part of the operation of preferentially searching for the at least one second band, the at least one communication processor may be configured to: preferentially search for the at least one second band during a period set corresponding to the priority higher than the priority which corresponds to the first cell.

According to various embodiments, the at least one communication processor may be further configured to: identify at least one third band which does not support the dual connectivity and has a priority higher than the priority which corresponds to the first cell based on the information about the at least one neighbor cell, and search for the at least one third band during a period set corresponding to the priority higher than the priority which corresponds to the first cell.

According to various embodiments, an electronic device includes at least one communication processor configured to support a first network communication and a second network communication; and a memory configured to store information about at least one first band supporting dual connectivity for the first network communication and the second network communication among a plurality of bands which correspond to the first network communication, and the at least one communication processor may be configured to: camp on a first cell supporting the first network communication; receive information about at least one neighbor cell from the first cell after camping on the first cell; identify at least one band which has a priority lower than or equal to a priority of the first cell and corresponds to the at least one neighbor cell; identify at least one second band supporting the dual connectivity among at the least one band based on the information about the at least one first band; and search for the at least one second band in a case that a cell selection RX level value (Srxlev) for the first cell is greater than a first threshold value, and a cell selection quality value (Squal) for the first cell is greater than a second threshold value.

According to various embodiments, the at least one communication processor may be further configured to: identify at least one third band which does not support the dual connectivity and has a priority lower than or equal to a priority which corresponds to the first cell based on the information about the at least one neighbor cell, and suspend search for the at least one third band in a case that the cell selection RX level value for the first cell is greater than the first threshold value, and the cell selection quality value for the first cell is greater than the second threshold value.

As is apparent from the foregoing description, according to various embodiments, an electronic device capable of preferentially performing a search for a frequency supporting dual connectivity and performing cell reselection based on the search report, and an operating method thereof may be provided. So, a possibility of camping on a cell supporting the dual connectivity may be increased, and a time required for camping on to the cell supporting the dual connectivity may be decreased.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry", etc. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., an internal memory or external memory) that is readable by a machine (e.g., a master device or a task performing device). For example, a processor of the machine (e.g., the master device or the task performing device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   at least one communication processor configured to support a first network communication and a second network communication; and
   a memory configured to store information about at least one first band supporting dual connectivity for the first network communication and the second network communication among a plurality of bands that correspond to the first network communication,
   wherein the at least one communication processor is configured to:
      camp on a first cell supporting the first network communication;
      receive information about at least one neighbor cell from the first cell after camping on the first cell;
      identify at least one second band supporting the dual connectivity among at least one band that corresponds to the at least one neighbor cell based on the information about the at least one first band and the information about the at least one neighbor cell;
      preferentially search for the at least one second band among the at least one band that corresponds to the at least one neighbor cell; and
      perform cell reselection from the first cell to another cell based on a search result.

2. The electronic device of claim 1, wherein, as at least part of an operation of identifying the at least one second band supporting the dual connectivity among the at least one band that corresponds to the at least one neighbor cell, the at least one communication processor is configured to:
   identify at least one third band having a priority higher than a priority that corresponds to the first cell based on the information about the at least one neighbor cell; and
   identify the at least one second band supporting the dual connectivity among the at least one third band.

3. The electronic device of claim 2, wherein, as at least part of an operation of preferentially searching for the at least one second band, the at least one communication processor is configured to:
   preferentially search for the at least one second band during a period set corresponding to the priority higher than the priority that corresponds to the first cell.

4. The electronic device of claim 1, wherein the at least one communication processor is further configured to:
   identify at least one fourth band that does not support the dual connectivity and has a priority higher than a priority that corresponds to the first cell based on the information about the at least one neighbor cell; and search for the at least one fourth band during a period set corresponding to the priority higher than the priority that corresponds to the first cell.

5. The electronic device of claim 1, wherein, as at least part of an operation of identifying the at least one second band supporting the dual connectivity among the at least one band that corresponds to the at least one neighbor cell, the at least one communication processor is configured to:

identify at least one fifth band having a priority lower than or equal to a priority that corresponds to the first cell based on the information about the at least one neighbor cell; and identify the at least one second band supporting the dual connectivity among the at least one fifth band.

6. The electronic device of claim 5, wherein, as at least part of an operation of preferentially searching for the at least one second band, the at least one communication processor is configured to:

search for the at least one second band even in a case that a cell selection RX level value (Srxlev) for the first cell is greater than a first threshold value, and a cell selection quality value (Squal) for the first cell is greater than a second threshold value.

7. The electronic device of claim 1, wherein the at least one communication processor is further configured to:

identify at least one sixth band that does not support the dual connectivity and has a priority lower than or equal to a priority that corresponds to the first cell based on the information about the at least one neighbor cell; and suspend search for the at least one sixth band in a case that a cell selection RX level value (Srxlev) for the first cell is greater than a first threshold value, and a cell selection quality value (Squal) for the first cell is greater than a second threshold value.

8. The electronic device of claim 1, wherein, as at least part of an operation of receiving the information about the at least one neighbor cell, the at least one communication processor is configured to:

receive the information about the at least one neighbor cell including at least one of the at least one band that corresponds to each of the at least one neighbor cell, or inter-frequency carrier frequency that corresponds to the first cell.

9. The electronic device of claim 8, wherein, as at least part of an operation of identifying the at least one second band, the at least one communication processor is configured to:

identify the at least one second band based on a compared result between the at least one first band stored in the memory and at least one of the at least one band that corresponds to each of the at least one neighbor cell, or the inter-frequency carrier frequency that corresponds to the first cell.

10. The electronic device of claim 1, wherein, as at least part of an operation of preferentially searching for the at least one second band, the at least one communication processor is configured to:

perform at least one of an operation of first searching for the at least one second band compared to at least one remaining band, an operation of searching for the at least one second band during a period longer than the at least one remaining band, or an operation of searching for the at least one second band with a frequency higher than the at least one remaining band.

11. The electronic device of claim 1, wherein, as at least part of an operation of performing the cell reselection from the first cell to the other cell based on the search result, the at least one communication processor is configured to:

when a first suitable cell is searched based on the search result for the at least one second band, camp on the first suitable cell.

12. The electronic device of claim 11, wherein, as at least part of the operation of performing the cell reselection from the first cell to the other cell based on the search result, the at least one communication processor is configured to:

based on a suitable cell being not searched according to the search result for the at least one second band, perform a search for a remaining band except for the at least one second band; and when a second suitable cell is searched according to the search result for the remaining band, camp on the second suitable cell.

13. The electronic device of claim 1, wherein the memory is configured to store information about a cell that does not support the dual connectivity, and wherein, as at least part of an operation of preferentially searching for the at least one second band, the at least one communication processor is configured to:

perform a search except for a band corresponding to the cell that does not support the dual connectivity among the at least one second band.

14. The electronic device of claim 1, wherein, as at least part of an operation of preferentially searching for the at least one second band, the at least one communication processor is configured to:

identify whether a prior search release criterion is detected; and preferentially search for the at least one second band before the prior search release criterion is detected.

15. The electronic device of claim 14, wherein the at least one communication processor is configured to perform a search for the at least one band that corresponds to the at least one neighbor cell based on the prior search release criterion being detected.

16. An electronic device comprising:

at least one communication processor configured to support a first network communication and a second network communication; and a memory configured to store information about at least one first band supporting dual connectivity for the first network communication and the second network communication among a plurality of bands that correspond to the first network communication, wherein the at least one communication processor is configured to:

camp on a first cell supporting the first network communication;

receive information about at least one neighbor cell from the first cell after camping on the first cell;

identify at least one band that has a priority higher than a priority of the first cell and corresponds to the at least one neighbor cell;

identify at least one second band supporting the dual connectivity among the at least one band based on the information about the at least one first band;

preferentially search for the at least one second band among the at least one band that corresponds to the at least one neighbor cell; and perform cell reselection from the first cell to another cell based on a search result.

17. The electronic device of claim 16, wherein, as at least part of an operation of preferentially searching for the at least one second band, the at least one communication processor is configured to:
preferentially search for the at least one second band during a period set corresponding to the priority higher than the priority that corresponds to the first cell.

18. The electronic device of claim 16, wherein the at least one communication processor is further configured to:
identify at least one third band that does not support the dual connectivity and has a priority higher than the priority that corresponds to the first cell based on the information about the at least one neighbor cell; and
search for the at least one third band during a period set corresponding to the priority higher than the priority that corresponds to the first cell.

19. An electronic device comprising:
at least one communication processor configured to support a first network communication and a second network communication; and
a memory configured to store information about at least one first band supporting dual connectivity for the first network communication and the second network communication among a plurality of bands that corresponds to the first network communication,
wherein the at least one communication processor is configured to:
camp on a first cell supporting the first network communication;
receive information about at least one neighbor cell from the first cell after camping on the first cell;
identify at least one band that has a priority lower than or equal to a priority of the first cell and corresponds to the at least one neighbor cell;
identify at least one second band supporting the dual connectivity among the at least one band based on the information about the at least one first band; and
search for the at least one second band in case that a cell selection RX level value (Srxlev) for the first cell is greater than a first threshold value, and a cell selection quality value (Squal) for the first cell is greater than a second threshold value.

20. The electronic device of claim 19, wherein the at least one communication processor is further configured to:
identify at least one third band that does not support the dual connectivity and has the priority lower than or equal to a priority that corresponds to the first cell based on the information about the at least one neighbor cell; and
suspend search for the at least one third band in case that the cell selection RX level value for the first cell is greater than the first threshold value, and the cell selection quality value for the first cell is greater than the second threshold value.

* * * * *